US012467563B2

(12) United States Patent
Sinoplu et al.

(10) Patent No.: US 12,467,563 B2
(45) Date of Patent: Nov. 11, 2025

(54) SYSTEM FOR CONNECTING RIGID PIPES AND FOR CONNECTING FLEXIBLE PIPES, AND FITTINGS FOR SUCH A SYSTEM

(71) Applicant: Viega Technology GmbH & Co. KG, Attendorn (DE)

(72) Inventors: Sudi Sinoplu, Attendorn (DE); Stefan Rocksloh, Attendorn (DE); Fabian Düperthal, Lennestadt (DE); Anton Hartmann, Attendorn (DE); Paul Köster, Olpe (DE); Philipp Dasbach, Wilnsdorf (DE); Mesut Avci, Attendorn (DE); Jörg Rosenthal, Reichshof-Eckenhagen (DE); Andreas Müller, Freudenberg (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 34 days.

(21) Appl. No.: 18/289,281

(22) PCT Filed: May 3, 2022

(86) PCT No.: PCT/EP2022/061807
§ 371 (c)(1),
(2) Date: Nov. 2, 2023

(87) PCT Pub. No.: WO2022/233844
PCT Pub. Date: Nov. 10, 2022

(65) Prior Publication Data
US 2024/0151331 A1 May 9, 2024

(30) Foreign Application Priority Data
May 4, 2021 (EP) .................................... 21172019

(51) Int. Cl.
*F16L 13/14* (2006.01)
*F16L 13/02* (2006.01)

(52) U.S. Cl.
CPC ......... *F16L 13/142* (2013.01); *F16L 13/0209* (2013.01)

(58) Field of Classification Search
CPC ....... F16L 13/14; F16L 13/141; F16L 13/142; F16L 13/143; F16L 13/148; F16L 13/16;
(Continued)

(56) References Cited

U.S. PATENT DOCUMENTS 3,149,861 A * 9/1964 Larsson ................ F16L 13/142 29/451
5,025,546 A * 6/1991 Gotoh ................... F16L 13/142 29/508
(Continued)

FOREIGN PATENT DOCUMENTS

CN 213089124 U 4/2021
DE 20302761 U1 4/2003
(Continued)

*Primary Examiner* — Aaron M Dunwoody
(74) *Attorney, Agent, or Firm* — The Webb Law Firm

(57) ABSTRACT

The invention relates to a system for connecting rigid pipes and for connecting flexible pipes. The pipes have corresponding outer diameters, with a press jaw having a press contour, with at least one first fitting for press-fitting to a rigid pipe, the at least one first fitting having a first press sleeve with a first outer contour, with at least one second fitting for press-fitting to a flexible pipe, the at least one second fitting having a second press sleeve with a second outer contour, the at least one second fitting having a second press sleeve with a second outer contour has a second press sleeve with a second outer contour, the outer contour of the first press sleeve and the outer contour of the second press sleeve in each case being adapted at least in sections to the press contour of the press jaw of the press jaw and can be
(Continued)

pressed by the press jaw and wherein the outer contours of the first press sleeve and of the second press sleeve correspond at least in sections. This system solves the technical problem of simplifying the on-site effort for installing piping systems. In particular, the task is to specify suitable combinations of fittings for rigid and flexible pipes.

23 Claims, 24 Drawing Sheets

(58) Field of Classification Search
CPC ....... F16L 13/161; F16L 13/163; F16L 33/20; F16L 33/207; F16L 33/2073; F16L 33/2076; F16L 2013/145; B21D 39/04; B21D 39/046
See application file for complete search history.

(56) References Cited

U.S. PATENT DOCUMENTS

| | | | | |
|---|---|---|---|---|
| 5,484,172 | A | 1/1996 | Unewisse et al. | |
| 5,484,174 | A * | 1/1996 | Gotoh | F16L 13/142 29/508 |
| 5,749,396 | A * | 5/1998 | Takahashi | F16L 33/2073 138/108 |
| 2008/0277931 | A1 | 11/2008 | Poschenrieder et al. | |
| 2010/0229368 | A1 * | 9/2010 | Frenken | F16L 13/142 29/516 |
| 2010/0244436 | A1 * | 9/2010 | Mester | F16L 13/142 285/39 |
| 2012/0161438 | A1 | 6/2012 | Rischen et al. | |
| 2013/0167357 | A1 * | 7/2013 | Arment | F16L 13/142 148/684 |
| 2019/0024827 | A1 | 1/2019 | Ruissen et al. | |
| 2020/0378530 | A1 | 12/2020 | Schneider et al. | |
| 2021/0285576 | A1 * | 9/2021 | Pozzetti | B25B 27/10 |
| 2024/0151331 | A1 * | 5/2024 | Sinoplu | B25B 27/10 |
| 2024/0229984 | A1 * | 7/2024 | Rosenthal | F16L 13/142 |

FOREIGN PATENT DOCUMENTS

| | | | |
|---|---|---|---|
| DE | 102015109268 | A1 | 12/2016 |
| EP | 2677223 | B1 | 8/2015 |
| GB | 687497 | A | 2/1953 |
| JP | S62199234 | A | 9/1987 |
| JP | H3186684 | A | 8/1991 |
| JP | H5248572 | A | 9/1993 |
| JP | H10185030 | A | 7/1998 |
| JP | 2011169335 | A | 9/2011 |
| JP | 202114913 | A | 2/2021 |

* cited by examiner $\delta=1$
$\alpha=1$ $\delta<0,5$
$\alpha<0,5$ $\delta<0,5$
$\alpha<0,5$ $\delta<0,5$
$\alpha<0,5$ $\delta>1,5$
$\alpha>1,5$ $\delta>1,5$
$\alpha>1,5$ $\delta>1,5$
$\alpha>1,5$

SYSTEM FOR CONNECTING RIGID PIPES AND FOR CONNECTING FLEXIBLE PIPES, AND FITTINGS FOR SUCH A SYSTEM

CROSS-REFERENCE TO RELATED APPLICATIONS

This application is the United States national phase of International Application No. PCT/EP2022/061807 filed May 3, 2022, and claims priority to European Patent Application No. 21172019.8 filed May 4, 2021, the disclosures of which are hereby incorporated by reference in their entireties.

BACKGROUND OF THE INVENTION

Field of the Invention

The invention relates to a system for connecting rigid pipes and for connecting flexible pipes, the pipes having corresponding outer diameters. The invention also relates to a plurality of fittings suitable for use in such a system and to a system of fittings.

Description of Related Art

The technical field relevant to the present invention is the on-site installation of piping systems, in which a piping system consisting of pipe sections and fittings is generally installed for conducting and guiding a fluid, i.e. a liquid or a gas. A fitting is generally understood to be a connector for a pipeline, and a fitting is most commonly used to connect two or more pipe sections. Accordingly, the fitting preferably has two or more compression sections, for example in the form of compression sleeves. The most common fittings include straight connections, changes of direction in the form of pipe bends, reducers, branches such as T-pieces or crossings. However, a fitting is also understood to be a pipe connection of a fitting or other component. For example, thermometers or pressure gauges as fittings have only one connection for a pipe section. Thus, the fitting of a fitting only has a press section to connect a pipe section to the fitting.

For the connection of the pipe sections with the fittings and other components, press connections are used in which a press section of a fitting is formed radially inwards by means of a press jaw when the pipe section is inserted so that a permanent and tight, possibly even non-detachable connection is produced. The fittings can be provided with a sealing agent, for example an O-ring, which ensures the tightness of the connection, or they can also be formed by means of direct contact between the materials of the pipe section and the fitting, for example a metallic seal.

Press techniques for radial forming of the press section are mainly radial-acting press systems as well as press systems that use radial-axial pressing, wherein a part of the fitting is axially displaced during the press process in order to effect radial forming.

The piping systems described above are used in particular to transport drinking or heating water, gas for operating a heating system or industrial gases. In principle, any fluid medium can be transported in the pipelines.

In the context of this application, a rigid pipe is understood to be a pipe that is connected to an externally sealing fitting. The strength of the material of the pipe is sufficient that the forces acting through the fitting from the outside allow a permanent seal, but do not deform the rigid pipe or only so little that the connection remains stable and tight.

Furthermore, applications such as for PE pipes or thin-walled copper pipes are also known, which are sealed on the outside and an inner support sleeve is additionally used. This is because the strength of the material is not completely sufficient for an external seal without the risk of deformation of the pipe. The inserted support sleeve has only a supporting function and no sealing function. Such pipes are also understood as rigid pipes in the context of this application, as they can be connected to an externally sealing fitting.

In the context of this application, a flexible pipe is understood to be a pipe which is connected to a support body to be inserted into the pipe by means of an internally sealing fitting. The low strength of the material of the pipe requires that the forces acting through the fitting from the outside and inside allow a permanent seal without too much deformation. In this case, the flexible pipe is subjected to a force from the inside and outside so that the connection remains stable and tight.

On the one hand, solid materials, especially metallic materials, are used as materials for rigid pipes. Solid plastics can also be considered as solid materials. Rigid pipes are preferably used in an installation with larger straight sections along walls or ceilings or within wall or ceiling constructions.

On the other hand, flexible pipes are used in installations, especially plastic pipes, so-called all-plastic pipes, or pipes made of composite materials, so-called multi-layer composite pipes, consisting of one or more layers of plastic and one or more thin layers of metal. Flexible pipes are used in particular for the installation of front-wall technology such as retrofitted sanitary installations, where in confined spaces the flexible pipes are often bent to shape on site and installed in a curved state.

Furthermore, the rigid pipes and the flexible pipes are available in various outer diameters. For metal pipes, outside diameters in the range of 6 mm-108 mm and larger up to 6 inches are used. For plastic pipes, the outer diameters are usually in the range of 6 mm-63 mm, although significantly larger outer diameters are also used here.

When laying a piping system that uses both rigid pipes and flexible pipes, matching pipe dimensions are selected for the inner and outer diameters. The exact values may then only match by chance in pairs, so matching dimensions are selected with as good a match as possible. In combination with the specific fittings for rigid pipes and flexible pipes, there are thus usually specific fitting geometries and press jaw geometries for each system or dimension.

Therefore, different press jaws must be kept ready on a construction site for different pipelines and fittings. This means that the effort on the construction site is particularly high, as a number of press jaws and possibly even different press tools have to be kept in stock. This creates a great deal of complexity in the variety of products and the associated production, storage and logistics. For the customer, especially the craftsman, this complexity of pipes, fittings and press jaws is further increased because numerous systems from different manufacturers are available on the market.

The following solutions are known from the prior art.

US 2020/378530 A1 describes a fitting for connecting flexible, internally sealing pipes to a support body with a sealing function.

US 2019/024827 A1 discloses a fitting for connecting rigid, externally sealing pipes with a chamber, a sealing element, a clamping element with projecting ends, and a separating element between the sealing element and the clamping element.

DE 10 2015 109 268 A1 describes a fitting with a press sleeve with a chamber open at the distal end, in which a sealing element, cutting elements and a retaining element are arranged, wherein the retaining element partially protrudes axially from the chamber. The cutting elements are retained on the annular retaining element by the cutting elements being slipped, inserted, clamped or materially connected onto the retaining element.

GB 687 497 A discloses a fitting for connection to a flexible pipe in the form of a hose coupling having a base body including a support body connected to a sleeve. A multi-layer hose is connected to the fitting, wherein before the hose is inserted into the fitting, a portion of the outer layer is removed at the end, a ring is placed on top and the fabric of the reinforcement layer which has not been removed is placed around the ring. Thus, before and after pressing the fitting, the material of the reinforcing layer comes to lie between the open end of the pressing sleeve.

SUMMARY OF THE INVENTION

Therefore, the present invention is based on the technical problem of simplifying the on-site effort for installing piping systems. In particular, the technical problem is to specify suitable combinations of fittings for rigid and flexible pipes and of suitable press tools. Another technical problem is to specify fittings for use in the aforementioned systems, in particular to improve them in terms of manufacturing effort.

According to the invention, the aforementioned technical problem is solved by a system for connecting rigid pipes and for connecting flexible pipes, wherein the pipes have corresponding outer diameters, with a press jaw having a press contour, with at least one first fitting for press-fitting to a rigid pipe, wherein the at least one first fitting is formed as an externally sealing fitting and externally seals a rigid pipe to be connected, and wherein the at least one first fitting comprises a first press sleeve having a first outer contour, with at least one second fitting for press-fitting to a flexible pipe, wherein the at least one second fitting is formed as an internally sealing fitting and seals a flexible pipe to be connected from the inside, and wherein the at least one second fitting comprises a second press sleeve having a second outer contour, wherein the outer contour of the first press sleeve and the outer contour of the second press sleeve are each adapted at least in sections to the press contour of the press jaw and can be pressed by the press jaw.

According to the invention, it has been recognised that the effort on the construction site is reduced, if fittings for rigid pipes and fittings for flexible pipes each have a press sleeve whose outer contours match at least to such an extent, and are preferably even the same, so that they can be pressed with the same press tool and with the same press jaw connected thereto with a corresponding press contour. Thus, pipe systems with rigid pipes and pipe systems with flexible pipes can be installed with the same press tool and with the same press jaw. Therefore, fewer tools and press jaws have to be kept ready on site and the time required for setting up the tools is reduced. Fewer jaw changes or reduced tool complexity on site leads to easier tool management.

A press jaw is understood to be a part of the entire press tool system. In the most common application, the press jaw has two press jaw halves which are attached to a press tool, have an inlet contour which is operatively connected to a piston and are rotated from an open position to a closed position by a motor-driven linear piston. This rotary movement causes the pressing of a fitting arranged in the press jaw.

The press jaw can also consist of two press jaw halves which are connected to each other via a joint and have coupling means at the open end. A jointing clamp engages in the two coupling means of the press jaw, which in turn is part of a press tool and is operatively connected to a piston via an inlet contour. A linear advance of the piston of the press tool compresses the jointing clamp at the front end and, through engagement with the coupling means, also the press jaw. In addition to a two-part press jaw, multi-part press jaws are also known as press slings.

The materials used for rigid pipes are, in particular, metals such as stainless steels like ferritic steels like 1.4521, austenitic steels like 1.4404, duplex steels like 1.4462, gunmetal, SiBr, copper, but also solid plastics such as cross-linked polyethylene (PE-X), polyethylene with increased temperature resistance (PE-RT), polyvenyl chloride (PVC) and polypropylene (PP) with corresponding wall thicknesses. Furthermore, multi-layer composite pipes can be rigidly designed, for example with a thicker aluminium layer, and fibre-reinforced pipes can also be used. Flexible pipes can be made of the same plastics or of composites of plastic and metal layers, but with a smaller wall thickness, so that flexibility is ensured by the geometric design.

Rigid pipes and flexible pipes differ, regardless of the material property and dimensioning of the pipe, in that a rigid pipe can be connected by an externally sealing fitting, whereas a flexible pipe can only be connected by an internally sealing fitting. Due to the rigid property, the dimensional stability of the rigid pipe is sufficiently large to absorb the forces that occur during radial pressing and to ensure the sealing and holding or fixing function together with the pressed fitting. Flexible pipes, on the other hand, are supported from the inside by a support sleeve and are moulded onto the support sleeve when the fitting is pressed. Fittings for rigid pipes are therefore externally sealing fittings and fittings for flexible pipes are internally sealing fittings.

Since rigid pipes are often made of a material with a higher strength, they usually have a thinner wall thickness than flexible pipes made of a material with a lower strength. Therefore, the fittings of the described system are preferably used for pairs of, as far as possible, equal outer diameters of the rigid pipes and the flexible pipes, although the exact outer dimensions may differ from each other. The inner dimensions may differ more than the outer dimensions. For example, from an existing system of metal and plastic pipes, there are rigid pipes with an outer diameter of 16 mm and flexible pipes with an outer diameter of 15 mm.

This means that the outer diameters of the rigid pipes and the flexible pipes are the same or similar. If the rigid pipes and the flexible pipes are installed in a common pipe system, there are therefore only minor flow losses due to the likewise only slightly different internal cross-sections. Thus, the approach is to always combine a pair of adjacent outer diameters in a system with a press jaw with a press contour, for example the pairs of pipe outer diameters 16 mm/15 mm or 54 mm/50 mm.

As already explained in the introduction, a fitting is arranged on one side of a connector or a fitting. Depending on the function of the connector or fitting, there is usually one fitting for a fitting or up to four fittings for a crossing piece.

The described fittings and their components are preferably made of a metal to ensure formability with sufficient hardness and dimensional stability after forming. Possible metals are those already mentioned for the rigid pipes, for example stainless steels such as ferritic steels like 1.4521, austenitic steels like 1.4404, duplex steels like 1.4462, gunmetal, SiBr, copper.

However, the described fittings and their components can also be made of a non-metallic material or plastic if the non-metallic material allows sufficient properties for pressing and permanent connection with pipes. For example, the following materials can be used: cross-linked polyethylene (PE-X), silane-cross-linked polyethylene (PE-Xb) or physically cross-linked polyethylene (PE-Xc), polyethylene of increased temperature resistance (PE-RT), polyvenyl chloride (PVC), polypropylene (PP) with corresponding wall thicknesses, polyphenylsulphone (PPSU), polyetheretherketone (PEEK) or polyaryletherketone (PAEK). aliphatic bio-based polyamide (PA410, PA12, PA12-GF30) or polypropylene random copolymer with modified crystal structure and increased temperature resistance (PP-RCT).

In the system according to the invention, the outer contours of the first press sleeve and the second press sleeve are preferably adapted at least in sections to the press contour of the press jaw. In this case, the property "to be adapted" means that the outer contour of the respective press sleeve preferably rests against the press contour at least in sections over their surface. The press forces, which are preferably directed radially inwards, are transmitted to the press sleeve at the contact surfaces in sections during pressing by the press jaw. As a result, the press sleeve is formed in such a way that the holding effect and sealing effect against the pipe to be connected is permanently established.

The press sleeves can basically have different geometries as long as they have sections in the outer contour that become effective when the fitting is pressed with the press jaw. In a preferred manner, the press sleeves form a chamber directed inwards towards the pipe to be received, and that at least one clamp element, sealing element and/or force transmission element is accommodated in the chamber. By forming the chambers, the aforementioned elements can be pre-installed to create a pull-out-proof and tight connection between the rigid or flexible pipe and the fitting. The chamber can be enclosed on three sides by the press sleeve, but the chamber can also be at least partially open towards the distal end of the press sleeve.

Advantageously, the chamber of the first press sleeve and the chamber of the second press sleeve accommodate different clamp elements, sealing elements and/or force transmission elements. Thus, with the same press geometry of the press jaw and the first and second press sleeve, differently adapted elements to be pressed can be used for sealing as well as holding and fixing the rigid pipe or the flexible pipe within the first and the second fitting. The flexibility of the design of the fittings and the elements contained therein ensures a good adaptation of the fittings to rigid and flexible pipes alike, while the same press contour can be applied. Within the described system, an optimal connection technique is thus achieved for rigid and flexible pipes alike.

If—as described—the outer contours of the first press sleeve and the second press sleeve match at least in sections, the same sections of the press sleeves are pressed equally for both types of pipes. The press sleeves are thus formed in the same way in the matching sections when the press jaw is closed. In a further preferred manner, the press sleeves for the rigid pipes and the press sleeves for the flexible pipes have matching outer contours and are therefore formed, possibly with different press forces, by the same press jaw.

Furthermore, it can be provided that the first press sleeve has a first additional press section, that the second press sleeve has a second additional press section, wherein the first additional press section and the second additional press section have outer contours differing from each other and can each be formed in sections by the press jaw. Thus, different functionalities can be moulded into the fittings for rigid pipes and the fittings for flexible pipes. Nevertheless, both fittings are pressed with the same press jaw with the same press contour.

A basic structure of the fittings is that a base body is provided and that the press sleeves are integrally formed with the base body or are connected to the base body by a material or force fit. In the case of fittings for flexible pipes, a support sleeve is also provided to support and seal an inserted pipe from the inside and to absorb press forces.

In the following, embodiments for fittings for rigid pipes and for fittings for flexible pipes are described. On the one hand, these embodiments represent preferred embodiments of the described system. On the other hand, the embodiments also represent independent solutions to the above-mentioned technical problems, either individually or in combination.

In the following, dimensions and ratios of the dimensions of the fittings are calculated and compared. The calculations characterise the fittings of the described system in a preferred way.

In a preferred embodiment of the system, the ratio of the volume V(starr) of the chamber of the press sleeve of the first fitting to the volume V(flex) of the chamber of the press sleeve of the second fitting is given by $$\delta = \frac{V(starr)}{V(\text{flex})},$$

where the volume V(starr) is given by $$V(starr) = \frac{\pi \cdot LK(starr)}{4} \cdot \left(DK(starr)^2 - DR(starr)^2\right),$$

with LK(starr) the length of the chamber,
with DK(starr) the inner diameter of the chamber and
with DR(starr) the outer diameter of the rigid pipe to be accommodated,
where the volume V(flex) is given by $$V(\text{flex}) = \frac{\pi \cdot LK(\text{flex})}{4} \cdot \left(DK(\text{flex})^2 - DR(\text{flex})^2\right),$$

with LK(flex) the length of the chamber,
with DK(flex) the inner diameter of the chamber and
with DR(flex) the outer diameter of the flexible pipe to be accommodated,
in that the ratio is given by $$\delta = \frac{V(starr)}{V(\text{flex})} = \frac{LK(starr)}{LK(\text{flex})} \cdot \frac{\left(DK(starr)^2 - DR(starr)^2\right)}{\left(DK(\text{flex})^2 - DR(\text{flex})^2\right)},$$

wherein δ assumes values from a range of values [0.50; 3.00], preferably [0.50; 1.50], particularly preferably [0.75; 1.25].

The length of the chamber, also called the chamber length, is preferably determined by the length of the section forming the chamber with the same diameter, i.e. by the length of the cylindrical section forming the chamber. Rounded areas on one or both sides of the cylindrical section are not taken into account when determining the chamber length.

The ratio δ of the described embodiment thus indicates the ratio of the volume of the chamber of the press sleeve of a fitting for pressing a rigid pipe circulating around an inserted pipe and of the volume of the chamber of the press sleeve of a fitting for pressing a flexible pipe circulating around an inserted pipe. Similar chamber volumes and thus a ratio δ as close as possible to the value 1 facilitate the pressing of rigid and flexible pipes with the same press contour.

If, on the other hand, the chamber volumes are significantly unequal, pressing of rigid and flexible pipes with one press contour cannot be completely guaranteed.

For example, with a ratio of the chamber volumes $\delta<0.5$, where the chamber volume of the press sleeve of the fitting for flexible pipes is thus at least twice as large as the chamber volume of the press sleeve of the fitting for rigid pipes, on the one hand, the chamber length of the press sleeve of the fitting for rigid pipes may be chosen too short to accommodate elements provided in the chamber. On the other hand, for such a ratio, the chamber of the press sleeve of the fitting for rigid pipes may have too low a height and thus too low a degree of compression. It is also possible that for a ratio $\delta<0.5$, the chamber of the press sleeve of the fitting for flexible pipes requires an excessively large height and thus too high a degree of compression.

On the other hand, for a ratio of the chamber volumes $\delta>1, 5$, in particular $\delta>3.0$, in which the chamber volume of the press sleeve of the fitting for rigid pipes is thus larger by a factor of at least 1.5, in particular at least 3.0, than the chamber volume of the press sleeve of the fitting for flexible pipes, on the one hand the chamber length of the press sleeve of the press sleeve of the fitting for flexible pipes may be selected to be too short for accommodating elements provided in the chamber, such as a force transmission ring. On the other hand, for such a ratio, the chamber of the press sleeve of the fitting for flexible pipes may have too low a height and thus too low a degree of compression. It is also possible that for a ratio $\delta>1, 5$, in particular $\delta>3.0$, the chamber of the press sleeve of the fitting for rigid pipes has an excessively large height and thus too high a degree of compression.

If, on the other hand, as indicated in the preferred embodiment of the system, chamber volumes that are as similar as possible are selected, then the ratio is $\delta=1$. Thus, both the chamber height and the chamber length of the press sleeves of the fittings for rigid and flexible pipes can be selected in such a way that an equal degree of pressing is achieved with one press contour for pressing rigid and flexible pipes. In this way, a sealing pressing of rigid and flexible pipes can be ensured with one press contour.

Alternatively, the system with deliberately different chamber volumes can also be selected, in which case the ratio of the chamber volumes within the described limits is not equal to 1, i.e. $\delta<>1$. Thus, both the chamber height and the chamber length of the press sleeves of the fittings for rigid and flexible pipes can be selected in such a way that an optimal arrangement of different functional elements within the chamber of the first fitting for rigid pipes and of the second fitting for flexible pipes can be achieved by different chamber volumes. In this way, a press contour can ensure a sealing pressing of rigid and flexible pipes with simultaneous optimal adaptation of the functional elements.

In another preferred embodiment of the system, the ratio of the difference of the inner diameter DK(starr) of the chamber of the press sleeve of the first fitting and the outer diameter DR(starr) of the rigid pipe to be accommodated to twice the length LK(starr) of the chamber is given by $$\varepsilon(starr) = \frac{DK(starr) - DR(starr)}{2 \cdot LK(starr)}$$

and ε(starr) assumes values from a range of values [0.10; 0.50], preferably [0.2; 0.4], particularly preferably [0.25; 0.35].

The parameter ε(starr) of the described embodiment thus indicates the ratio of the chamber height to the chamber length of the press sleeve of a fitting for pressing a rigid pipe. It has been shown that a ratio in which the value ε(starr) is as close as possible to 0.3 or deviates as little as possible from this value, i.e. the chamber height corresponds to approximately one third of the chamber length, achieves a sufficient degree of compression for the safe compression of rigid pipes by means of the press sleeve of the fitting for compression for rigid pipes.

For values of ε(starr) that deviate significantly from the target value ε(starr)=0.3, it has been shown that various disadvantages result from a significantly shorter or significantly longer chosen chamber length compared to the chamber height.

For example, a value ε(starr)<0.1, where the chamber length is more than 10 times the chamber height, may mean, on the one hand, that the chamber length is too long for the installation space achieved. On the other hand, for such an ε(starr) with a sensibly chosen chamber length, the chamber height may be too small to provide sufficient space in the chamber for the elements to be accommodated therein. It is also possible that for ε(starr)<0.1 a too high degree of compression is achieved.

For example, for a value ε(starr)>0.5, where the chamber length is less than 2 times the chamber height, if the chamber height is sensibly chosen, the chamber length may be too short to provide sufficient space in the chamber for the elements to be accommodated therein. It is also possible that for ε(starr)>0.5 too high a degree of compression is achieved.

If, on the other hand, as indicated in the preferred embodiment of the system, an ε(starr) is selected as close as possible to the target value of ε(starr)=0.3, such a selected ratio of chamber length to chamber height can ensure sufficient space for accommodating elements inside the chamber as well as an optimally selected degree of compression for safe compression of rigid pipes.

In a further preferred embodiment of the system, the ratio of the difference of the inner diameter DK(flex) of the chamber of the press sleeve of the second fitting and the outer diameter DR(flex) of the flexible pipe to be accommodated to twice the length LK(flex) of the chamber is given by $$\varepsilon(\text{flex}) = \frac{DK(\text{flex}) - DR(\text{flex})}{2 \cdot LK(\text{flex})}$$

and ε(flex) assumes values from a range of values [0.10; 0.70], in particular [0.10; 0.50], preferably [0.20; 0.60], in particular [0.2; 0.4], more preferably [0.25; 0.50], in particular [0.25; 0.35].

The parameter ε(flex) of the described embodiment thus indicates the ratio of the chamber height to the chamber length of the press sleeve of a fitting for pressing a flexible pipe. The advantages and disadvantages resulting from the choice of the value of the parameter ε(flex) correspond to the previously described advantages and disadvantages of the parameter ε(starr), so that a target value of ε(flex)=0.3 is also aimed at for the chamber geometry of the press sleeve of a fitting for pressing a flexible pipe with a sufficient degree of compression and sufficient space to accommodate elements inside the chamber.

In another preferred embodiment of the system, where ε(starr) is given by $$\varepsilon(starr) = \frac{DK(starr) - DR(starr)}{2 \cdot LK(starr)},$$

with the inner diameter DK(starr) of the chamber of the press sleeve of the first fitting,
with the outer diameter DR(starr) of the rigid pipe to be accommodated and
with the length LK(starr) of the chamber,
where ε(flex) is given by $$\varepsilon(\text{flex}) = \frac{DK(\text{flex}) - DR(\text{flex})}{2 \cdot LK(\text{flex})},$$

with the inner diameter DK(flex) of the chamber of the press sleeve of the second fitting,
with the outer diameter DR(flex) of the flexible pipe to be accommodated and
with the length LK(flex) of the chamber,
the ratio α is given by $$\alpha = \frac{\varepsilon(starr)}{\varepsilon(\text{flex})} = \frac{LK(starr)}{LK(\text{flex})} \cdot \frac{(DK(starr) - DR(starr))}{(DK(\text{flex}) - DR(\text{flex}))}$$

and α assumes values from a range of values [0.50; 3.00], preferably [0.50; 1.50], particularly preferably [0.75; 1.25].

The ratio α of the described embodiment thus indicates the ratio of the chamber height and 10 length of the press sleeve of a fitting for pressing rigid pipes and the ratio of the chamber height and length of the press sleeve of a fitting for pressing flexible pipes. Similar ratios of chamber height and length of the press sleeves and thus a ratio δ as close as possible to the value 1 will improve the pressing of rigid and flexible pipes with the same press contour.

The resulting from the choice of the value of the ratio $$\alpha = \frac{\varepsilon(starr)}{\varepsilon(\text{flex})}$$

correspond to the advantages and disadvantages described above for the value of the ratio δ of the volume of the chamber of the press sleeve of a fitting for pressing a rigid pipe and the volume of the chamber of the press sleeve of a fitting for pressing a flexible pipe, wherein a value α<0.5 corresponds to a ratio of chamber height and length of the press sleeve of a fitting for connecting a flexible pipe being at least 2 times greater than the corresponding ratio of the press sleeve of a fitting for connecting a rigid pipe, and wherein a value α>1.5 corresponding to a ratio of chamber height and length of the press sleeve of a fitting for connecting a rigid pipe being at least 1.5 times greater than the corresponding ratio of the press sleeve of a fitting for connecting a flexible pipe.

In another preferred embodiment of the system, the degree of compression β(starr) when press-fitting the first fitting to a rigid pipe is given by $$\beta(starr) = \frac{DK(starr) + 2s(starr) - DR(starr)}{DR(starr)},$$

with the inner diameter DK(starr) of the chamber of the press sleeve of the first fitting before pressing,
with the wall thickness s(starr) of the press sleeve in the region of the first fitting to be pressed before pressing,
with the outer diameter DR(starr) of the rigid pipe to be accommodated before pressing and
with the inner diameter DPK(starr) of the press contour of the press jaw in the region of the first fitting DR(starr) to be pressed,
where β(starr) assumes values with β(starr)<0.15, preferably β(starr)<0.12, particularly preferably β(starr)<0.10.

In this way, a tight connection with high pull-out strength is achieved during pressing and the wrinkling of the pipe to be connected and the fitting can be minimised. The degree of pressing indicates the change in the chamber diameter of the press sleeve during pressing, taking into account the wall thickness of the press sleeve, and relates this change to the diameter of the pipe to be pressed. The change is achieved by compressing the press jaw during pressing, wherein the inner diameter of the press jaw after pressing is decisive for the diameter of the chamber of the press sleeve in the pressed state.

A degree of compression of about 0, corresponding to a degree of compression of about 0%, means that the chamber has not been pressed and thus has not undergone any change in diameter. For large pipe diameters, however, the degree of compression indicated by β(starr) can easily take on values in the low percentage range, about 1% corresponding to β(starr)=0.01, even if the pressing has sealed satisfactorily. If, on the other hand, too high a degree of compression is selected, for example a degree of compression of 0.15 or greater, corresponding to a degree of compression greater than 15%, this can result in excessive forming and ultimately in deformation the fitting to be pressed and/or the pipe.

In another preferred embodiment of the system, the degree of compression β(flex) when press-fitting the second fitting to a flexible pipe is given by $$\beta(\text{flex}) = \frac{DK(\text{flex}) + 2s(\text{flex}) - DR(\text{flex})}{DR(\text{flex})},$$

with the inner diameter DK(flex) of the chamber of the press sleeve of the second fitting before pressing,
with the wall thickness s(flex) of the press sleeve in the region of the second fitting to be pressed before pressing,
with the outer diameter DR(flex) of the flexible pipe to be accommodated before pressing and
with the inner diameter DPK(flex) of the press contour of the press jaw in the region of the second fitting to be pressed after pressing,
wherein β(flex) assumes values with β(flex)<0.15, preferably β(flex)<0.12, particularly preferably β(flex)<0.10.

In this way, a tight connection with high pull-out strength can be achieved and the wrinkling of the pipe to be connected and the fitting can be minimised during pressing.

On the other hand, a degree of compression β(flex) of about 0, corresponding to a degree of compression of about 0%, means that no sealing compression of the fitting with the pipe to be connected has taken place and that the chamber diameter of the compression sleeve has not undergone any change. For large pipe diameters, however, the degree of compression indicated by β(flex) can easily take on values in the low percentage range, about 1% corresponding to β(flex)=0.01, even with satisfactory sealing compression. If the degree of compression β(flex) assumes values that are too high, for example at a degree of compression of 0.15 or greater, corresponding to a degree of compression of 15% or greater, the fitting or pipe to be pressed may be deformed too much, so that wrinkling occurs and the excessive press forces lead to deformation of the fitting and/or pipe to be pressed.

In a further preferred embodiment of the system, the degree of compression β(starr) when press-fitting the first fitting to a rigid pipe is given by $$\beta(starr) = \frac{DK(starr) + 2s(starr) - DR(starr)}{DR(starr)},$$

with the inner diameter DK(starr) of the chamber of the press sleeve of the first fitting before pressing, with the wall thickness s(starr) of the press sleeve in the area of the first fitting to be pressed before pressing, with the outer diameter DR(starr) of the rigid pipe to be received before pressing and with the inner diameter DPK (starr) of the press contour of the press jaw in the area of the first fitting to be pressed after pressing, and the degree of compression β(flex) when the second fitting is press-fitted to a flexible pipe is given by $$\beta(\text{flex}) = \frac{DK(\text{flex}) + 2s(\text{flex}) - DR(\text{flex})}{DR(\text{flex})},$$

with the inner diameter DK(flex) of the chamber of the press sleeve of the second fitting before pressing, with the wall thickness s(flex) of the press sleeve in the area of the second fitting to be pressed before pressing, with the outer diameter DR(flex) of the flexible pipe to be accommodated before pressing and with the inner diameter DPK(flex) of the press contour of the press jaw in the area of the second fitting to be pressed after pressing, so that the ratio τ is given by $$\tau = \frac{\beta(starr)}{\beta(\text{flex})} = \frac{DK(starr) + 2s(starr) - DPK(starr)}{DK(\text{flex}) + 2s(\text{flex}) - DPK(\text{flex})} \frac{DR(\text{flex})}{DR(starr)},$$

where τ assumes values from a range of values [0.50; 1.50], preferably [0.75; 1.5], particularly preferably [0.80; 1.20].

The ratio τ thus indicates the ratio of the degree of compression of the press connection of a fitting for a rigid pipe to the degree of compression of the press connection of a fitting for a flexible pipe with the same press tool, i.e. the same press jaw, and provides information as to whether the press connections are compressed to approximately the same degree.

By a suitable choice of the ratio τ, an optimal degree of pressing can thus be achieved both for pressing a fitting with a rigid pipe and for pressing a fitting with a flexible pipe with the same press tool. For example, an optimal pressing of a fitting with a rigid pipe can also achieve an optimal pressing of a fitting with a flexible pipe with the same press tool, so that collapsing or insufficient pressing of a fitting with a flexible pipe can be prevented when pressing with the same press tool without having to change the press tool for the pressing operations. At the same time, with optimal pressing of a fitting with a flexible pipe, collapsing or insufficient pressing of a fitting with a rigid pipe can be prevented when pressing with the same press tool.

If, on the other hand, too low or too high a ratio τ, for example τ<0.5 or τ>1.5, is chosen, the fitting for connection to a rigid pipe, when pressed with the same press tool, can either be pressed too much, causing it to collapse, or pressed too little, preventing a tight connection from being made.

On the other hand, in the case of optimum compression of the fitting for connection to a flexible pipe, if the ratio τ chosen is too low or too high, for example τ<0.5 or τ>1.5, either the fitting for connection to a rigid pipe may be compressed too little, causing the connection to leak and have too low a pull-out strength, or it may be compressed too much, causing damage to the rigid pipe and/or the elements in the chamber of the compression sleeve, for example the sealing element.

Alternatively, the system with deliberately different degrees of compression can also be selected, in which case the ratio of the degrees of compression within the described limits is not equal to 1, i.e. τ<>1. Thus, the degrees of compression of the press sleeves of the fittings for rigid and flexible pipes can be selected in such a way that an optimal arrangement of different functional elements within the chamber of the first fitting for rigid pipes and the second fitting for flexible pipes can be achieved by different designs of the fittings. In this way, a sealing pressing of rigid and flexible pipes can be ensured with a press contour while at the same time optimally adapting the functional elements.

An embodiment of a fitting for connection to a rigid pipe for a previously described system, which solves the technical problem indicated above, has a structure—with a base body, with a stop element formed circumferentially in the base body and projecting inwards, with a press sleeve connected to the base body and forming an outer contour, the press sleeve having a chamber directed inwards towards the pipe to be accommodated, with a clamp ring arranged in the chamber, the clamp ring consisting of a plastic material and having a plurality of clamp elements aligned against the pull-out direction of the pipe to be inserted, wherein the clamp elements are arranged in the distal area of the chamber opposite the stop element and are bearing against the wall in a distal outer corner area of the press sleeve, and with a sealing element arranged in the chamber adjacent to the stop element, wherein the press sleeve together with the clamp ring, the clamp elements and the sealing element seal the rigid pipe to be connected from the outside.

The press sleeve is preferably formed integrally and in one piece with the base body. In the pressed state, the sealing element lies gap-free against the press sleeve and the pipe to be inserted, as it is arranged in the area of the stop element, i.e. where the inserted pipe rests and ends. The absence of gaps improves hygiene, as dead spaces and areas subject to stagnation are avoided.

The pipe is secured against extraction and/or against excessive internal pressure by means of the clamp ring, which holds the clamp elements. The clamp elements absorb the pull-out force by deforming the pipe at certain points and supporting themselves against the wall of the press sleeve. This ensures a direct flow of force from the pipe via the press sleeve into the fitting. After pressing, the clamp ring itself only has a supporting function and contributes only slightly or not at all to securing the pull-out.

The clamp ring of the fitting described here is designed as a plastic clamp ring in which metal cutting blades are mounted as clamp elements. The plastic ring also has axially directed slots that make the clamp ring flexible and thus facilitate assembly in the fitting inside the press sleeve.

The clamp elements or the cutting blades can be designed as wire elements which are arranged in recesses provided for this purpose. An alternative embodiment of the clamp ring is a clamp ring consisting of two components, in which the cutting blades are placed in the injection mould and then overmoulded.

The clamp elements can be fixed in the plastic of the clamp ring by means of a force fit, a form fit or a material fit, for example by means of adhesion promoters. The clamp elements can be manufactured in various ways, for example as castings or stamped parts. The number of clamp elements can be determined depending on the requirement or dimension, preferably at least three clamp elements are provided. The same clamp elements can also be used for fittings for different pipe dimensions.

Furthermore, it is preferred that the clamp elements integrated in the clamp ring are arranged in the distal area of the chamber opposite the stop elements. When the press sleeve is pressed, the clamp elements are clamped at an angle and against the direction of extraction of the pipe between the deformed press sleeve and the pipe wall and generate a counterforce against the direction of extraction. This arrangement enables effective fixation of the pipe in the pressed fitting.

Furthermore, the clamp ring can have inwardly directed webs spaced apart from the clamp elements, the webs defining an internal cross-section which is equal to or slightly smaller than the external diameter of the pipe. The clamp ring performs a pipe holding function through the webs. The webs hold the inserted pipe in the unpressed state of the fitting so that the pipe cannot slip out of the fitting without major tensile force. In addition, the webs form a guide for the pipe when it is pushed into the fitting. If the inner cross-section is slightly smaller than the outer diameter of the pipe, the pipe is also offered little resistance when it is pushed in. Thus, the user receives a haptic feedback when inserting the pipe that the pipe is inserted deep enough into the fitting.

In principle, the clamp ring can also be designed as a classic metallic cutting ring or circumferential wire ring—as known from the prior art.

The described embodiment allows the rigid pipe to be inserted up to the stop element to signal to the user that the pipe to be connected has been inserted sufficiently deep into the fitting. In a preferred manner, the stop element consists of at least two inwardly directed recesses, for example punch marks, preferably three punch marks. In contrast to a completely circumferential recess, single recesses again create less dead space and thus hygienically improved conditions.

Furthermore, it is preferred that the seal is designed at least in sections as a lip seal and, after pressing, seals the gap between the pipe and the press sleeve up to the end of the inserted pipe. This ensures a high degree of hygiene and prevents crevice corrosion. Due to the fact that the seal is geometrically designed as a lip seal at least in sections, the gap between the pipe and the fitting is completely closed by the sealing element up to the end of the pipe after pressing the fitting. Thus, especially in connection with the described punctual pipe stop, dead spaces in which media can collect are avoided. The lip seal therefore ensures the required system tightness. Alternatively, the sealing element can be designed as a classic O-ring.

Another advantage is that the pipe is guided and held flat by the force transmission ring. This results in less pulling of the pipe when the fitting is pressed.

An embodiment of a fitting for connection to a flexible pipe for a previously described system, which solves the technical problem indicated above, has a structure with a base body, with a press sleeve connected to the base body and forming an outer contour, the press sleeve having a chamber directed inwards towards the pipe to be accommodated, with a force transmission ring arranged in the chamber and with a support body connected to the base body and provided with a sealing contour directed outwards towards the pipe to be inserted, wherein the force transmission ring is assembled in the press sleeve, wherein the press sleeve including the force transmission ring and the support body are arranged at a distance from each other and define an annular space for inserting and receiving the flexible pipe, wherein a portion of the force transmission ring protrudes axially from the press sleeve and forms a portion of the outer contour to be pressed, wherein the press sleeve together with the force transmission ring and the support body seal the flexible pipeto be connected from the inside.

The press sleeve including the force transmission ring and the support body are arranged at a distance from each other and define an annular space for inserting and receiving the flexible pipe. During pressing, the force transmission ring arranged in the chamber transmits the press force generated by the press jaw via the press sleeve to the flexible pipe and presses the pipe radially inwards onto the support body. The sealing contour arranged in the outside of the support body is pressed into the material of the flexible pipe, creating a fixation and a seal of the flexible pipe against the fitting. The sealing of the fitting against the pipe is preferably ensured without an additional soft seal via the sealing contour and the force transmission by the force transmission ring, which can be designed as a plastic ring.

Additionally or alternatively, an additional soft seal, for example an O-ring or a flat seal, for example made of ethylene-propylene-diene (monomer) rubber (EPDM), fluorocarbon rubber (FKM) or polytetrafluoroethylene (PTFE), can be provided. In both cases, the seal is preferably made at the outer end of the support body facing the pipe, so that no or only small dead spaces are created here.

The press sleeve or the support body are formed in one piece with the base body. However, they can also be connected to the base body either by material bonding, for example by welding or gluing, or by force bonding, for example by pressing or sliding on.

The support body is required to seal the flexible pipe, especially a multi-layer composite pipe, against the fitting. The support body is preferably made of metal and enables a significantly improved chemical resistance and robustness compared to support bodies made of a solid plastic such as polyphenylene sulphone (PPSU).

The section of the force transmission ring that protrudes axially from the press sleeve forms a section of the outer contour to be pressed. In this case, the chamber formed by the press sleeve is axially laterally open and is laterally closed by the force transmission ring. The protruding section of the force transmission ring not only serves to improve force transmission to the flexible pipe, but also serves to visually distinguish it from a fitting for rigid pipes with the same outer contour of a system described above. This is because a fitting for rigid pipes has a press sleeve made entirely of metal. In addition, this design of the force transmission ring is easier to assemble in the press sleeve.

Furthermore, the sleeve section and/or the force transmission ring may have inwardly projecting cams for guiding and holding the pipe. This achieves a retention of the pipe, a haptic feedback when overcoming the cams during the insertion of the pipe and also a guidance of the pipe during the insertion.

Furthermore, the press sleeve can have inwardly directed recesses, for example formed as punch marks or undercuts in the wall, for an internally arranged latching of the force transmission ring with the press sleeve.

Furthermore, the force transmission ring may have a cylindrical section and/or a toothed section for abutment against the pipe to be inserted to create the fixation.

Securing against pull-out of the pipe is done, for example, via corresponding retaining ribs of the sealing contour of the support body.

The force transmission ring can also have inwardly projecting webs that define an inner cross-section that is equal to or slightly smaller than the outer diameter of the pipe. Thus, the circumferentially distributed webs form a guide and support for the pipe.

A further embodiment of a fitting for connection to a rigid pipe for a previously described system which solves the technical problem identified above comprises a structure with a base body, with a press sleeve connected to the base body and forming an outer contour, the press sleeve having a chamber directed inwards towards the pipe to be accommodated, a sleeve section formed at the distal end of the press sleeve and extending beyond the chamber, the sleeve section forming a portion of the outer contour to be formed, and with a sealing element arranged in the chamber, wherein an inner portion of the base body extends radially inside the chamber in the direction of the pipe to be inserted, wherein a section of the sealing member is disposed between the press sleeve and the inner portion of the base body, wherein a portion of the sealing element is arranged between the press sleeve and the pipe to be inserted, wherein the press sleeve together with the sealing element seals the rigid pipe to be connected from the outside.

The sealing element thus preferably fills a substantial part of the chamber or the chamber completely. The sealing element seals both on the side of the base body and on the rigid pipe, which is inserted on the front side up to the base body. The axially extending sealing element also allows a high tolerance of the correct insertion depth of the pipe and ensures an almost gap-free connection.

This ensures a reliable seal and a division into an area in contact with the medium with the inner section of the base body and the end of the inserted pipe and an area of the press sleeve that is not in contact with the medium. In addition, the inner section of the base body and the end of the inserted pipe can also be in contact with each other on the front side. This creates a particularly good connection without restricting the open cross-section within the pipe and within the basic body of the fitting.

In this embodiment, too, the fixing function and the sealing function are realised by two separate elements. Preferably, the press sleeve is moulded onto the base body with a positive fit or is connected to the base body with a material bond.

In a preferred manner, the sleeve section and/or the sealing element has inwardly projecting cams for guiding and holding the pipe. This achieves a retention of the pipe, a haptic feedback when overcoming the cams during the insertion of the pipe and also a guidance of the pipe during the insertion.

Furthermore, the front distal section of the press sleeve can have factory-stamped cams that serve to locally deform the rigid pipe during pressing. Therefore, no clamp ring with holding function is necessary with this design. In addition, torsional strength is ensured after pressing with the cams. The cams can also serve to guide and hold the pipe.

Alternatively, a design of the described fitting with a cutting ring inserted in the chamber is also possible. In this case, the sealing element can be shorter in the axial direction than in the previously explained design example.

An embodiment of a fitting for connection to a flexible pipe for a previously described system, which solves the technical problem indicated above, has a structure with a base body, with a press sleeve connected to the base body and forming an outer contour, the press sleeve having a chamber directed inwards towards the pipe to be accommodated, with a force transmission ring arranged in the chamber and with a support body connected to the base body and provided with a sealing contour directed outwards towards the pipe to be inserted, wherein the press sleeve and the support body are connected to the base body as separate elements, and wherein the press sleeve and the force transmission ring have corresponding viewing windows, wherein the press sleeve together with the force transmission ring and the support body seal the flexible pipeto be connected from the inside.

The viewing windows serve as a visual insertion check to ensure that the pipe to be connected has been inserted sufficiently far into the fitting.

The press sleeve including the force transmission ring and the support body are thereby arranged at a distance from each other and define a space for inserting and receiving the flexible pipe. During pressing, the force transmission ring arranged in the chamber transmits the press force generated by the press jaw to the flexible pipe and presses the pipe radially inwards onto the support body. The sealing contour arranged in the outside of the support body is pressed into the material of the flexible pipe, creating a fixation and a seal of the flexible pipe against the fitting.

In a preferred manner, the press sleeve and the support body are designed as separate elements and are connected to the base body. Alternatively, the press sleeve or the support body can be formed in one piece with the base body. In this case, they can be connected to the base body either by material bonding, for example by welding or gluing, or by force bonding, for example by pressing or sliding on.

The support body is required to seal the flexible pipe, especially a multi-layer composite pipe, against the fitting. The support body is preferably made of metal and enables a significantly improved chemical resistance and robustness compared to support bodies made of a solid plastic such as polyphenylene sulphone (PPSU).

Furthermore, the sleeve section and/or the force transmission ring may have inwardly projecting cams for guiding and holding the pipe. This achieves a retention of the pipe, a haptic feedback when overcoming the cams during the insertion of the pipe and also a guidance of the pipe during the insertion.

Furthermore, the force transmission ring can have a cylindrical section and/or a toothed section for contact with the pipe to be inserted in order to create the fixation. By adjusting the wall thickness, the geometric difference between the outer diameters of the flexible pipes can be compensated.

The sealing of the fitting against the pipe is preferably ensured without an additional soft seal via the sealing contour and the force transmission by the force transmission ring, which can be designed as a plastic ring. By deforming the press sleeve during pressing, the flexible pipe is pressed onto the sealing contour, wherein a sealing effect is achieved.

Additionally or alternatively, an additional soft seal, for example an O-ring or a flat seal, for example made of ethylene-propylene-diene (monomer) rubber (EPDM), fluorocarbon rubber (FKM) or polytetrafluoroethylene (PTFE), can be provided. In both cases, the seal is preferably made at the outer end of the support body facing the pipe, so that no or only small dead spaces are created here.

Securing against pull-out of the pipe is done, for example, via corresponding retaining ribs of the sealing contour of the support body.

In a preferred embodiment, the press sleeve has a sleeve section extending beyond the chamber, the sleeve section forming a portion of the outer contour to be formed by a press jaw. The sleeve section serves to deform in the direction of the pipe in order to achieve an axial fixation and, if necessary, also an anti-rotation of the pipe relative to the fitting. Thus, the force transmission ring can also indirectly take over the sealing function and the described sleeve section serves to fix it.

The force transmission ring can also have inwardly projecting webs that define an inner cross-section that is equal to or slightly smaller than the outer diameter of the pipe. Thus, the circumferentially distributed webs form a guide and support for the pipe.

The above technical problem is also solved by a system for connecting rigid pipes and for connecting flexible pipes comprising a plurality of first fittings for connection to a rigid pipe, the first fittings being formed as externally sealing fittings and sealing from the outside rigid pipes to be connected, and a plurality of second fittings for connecting to a flexible pipe, the second fittings being formed as internally sealing fittings and seal the flexible pipe to be connected from the inside, wherein the first fittings for connecting to a rigid pipe comprise a base body and a press sleeve connected to the base body, wherein the second fittings for connection to a flexible pipe comprise a base body, a press sleeve connected to the base body and a support body connected to the base body, wherein the base body of the first fitting for connection to a rigid pipe and the base body of the second fitting for connection to a flexible pipe have the same structure.

The same structure is assumed if the basic bodies have the same dimensions and the same geometry, but differ from each other in the order of magnitude of manufacturing tolerances. The aim is to produce the basic bodies in large quantities, which can then be used for fittings for rigid pipes as well as for fittings for flexible pipes.

Preferably, the fittings correspond to the previously described fittings for connecting to a rigid pipe and the previously described fittings for connecting to a flexible pipe.

The fittings described above for the system for connecting rigid pipes and for connecting flexible pipes thus have the same base body and a matching press sleeve connected to it in each case. For flexible pipes, the support body is added. The base bodies can therefore have only small forming strains and can thus also be made of materials that are difficult to form, for example ferritic steels such as 1.4521 or duplex steels such as 1.4462. The same base body can thus be used in the fitting for rigid pipes as well as flexible pipes and thus enables a modular design of the fittings for the described system. This design has production-related advantages, as the same component is used as the basis for all fittings in the system.

However, the press sleeve differs in the respective application for rigid pipes and flexible pipes and is, for example, force-fitted to the base body by factory pressing. One advantage of the two-part construction of base body and press sleeve is that the fitting is divided into a base body that is in contact with the medium and a press sleeve that is not in contact with the medium. This makes it possible, for example, to manufacture the base body from a very high-quality, corrosion-resistant material, while using a low-cost material for the sleeve. In principle, the material can be selected specifically with regard to the respective requirement, i.e. the medium to be conveyed with the rigid pipe and/or the flexible pipe.

All fittings described above should also be geometrically designed with a flat chamber and with transitions that are as soft as possible, so that subsequent insulation is facilitated. This is because the flat chamber and the soft transitions make it easier to push a heat insulation pipe onto the pipe and the fitting without getting jammed on projections or blades.

Preferably, the ratio of chamber height to chamber length is chosen to be small, large radii are used, no beads or sharp blades are formed and/or the transition between the different stages is formed as a slope, preferably with a small angle.

The previously described fittings also have the advantage of a robust construction compared to plastic fittings. Many robust metallic components are integrated into the fittings so that, for example, there is little or no damage to the support body when the pipe is bent. The use of cutting elements in fittings for rigid pipes also achieves an increase in robustness, as it is not a frictional connection but a positive connection that provides the fixation.

BRIEF DESCRIPTION OF THE DRAWINGS

In the following, the invention is explained by means of exemplary embodiments with reference to the drawing. The drawing shows FIGS. 1*a-f* a first system for joining rigid pipes and for joining flexible pipes with information on the determination of the formulae, FIGS. 2*a-f* a second system for joining rigid pipes and for joining flexible pipes with information on the determination of the formulae, FIGS. 3*a-r* examples of the system according to FIGS. 1*a-d* and the system according to FIGS. 2*a-d* with information on the determination of the formulae, FIGS. 4*a-e* fitting for connecting to a rigid pipe, in particular for a system according to FIGS. 1*a* to 1*f*, FIGS. 5*a-e* fitting for connecting to a flexible pipe, in particular for a system according to FIGS. 1*a* to 1*f*, FIGS. 6*a-c* alternative designs of the fitting shown in FIGS. 5*a* to 5*e*, FIGS. 7*a-g* fitting for connecting to a rigid pipe, in particular for a system according to FIGS. 2*a* to 2*f* and FIG. 8*a-e* fitting for connecting to a flexible pipe, in particular for a system according to FIGS. 2*a* to 2*f*.

DESCRIPTION OF THE INVENTION

In the following description of the various embodiments according to the invention, components and elements with the same function and the same mode of operation are given the same reference signs, even if the components and elements may differ in dimension or shape in the various embodiments.

In the following, examples of embodiments of systems according to the invention for connecting rigid pipes and for connecting flexible pipes are first explained. The details of the individual fittings according to the invention are then discussed.

Figure 1A:
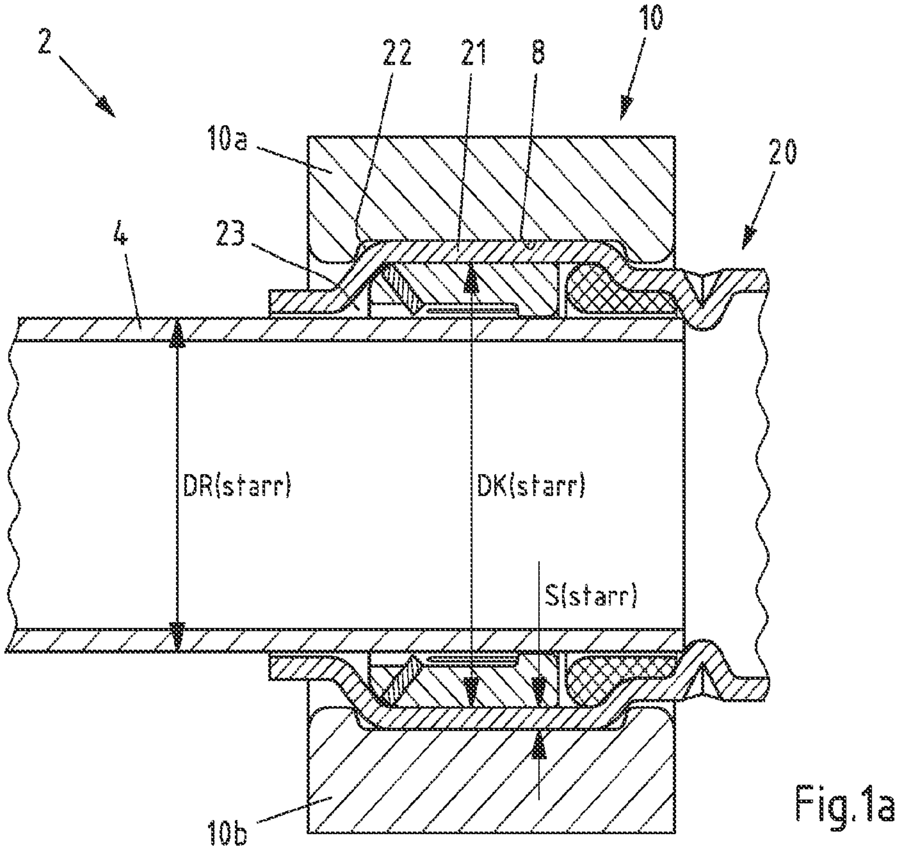
Figure 1B:
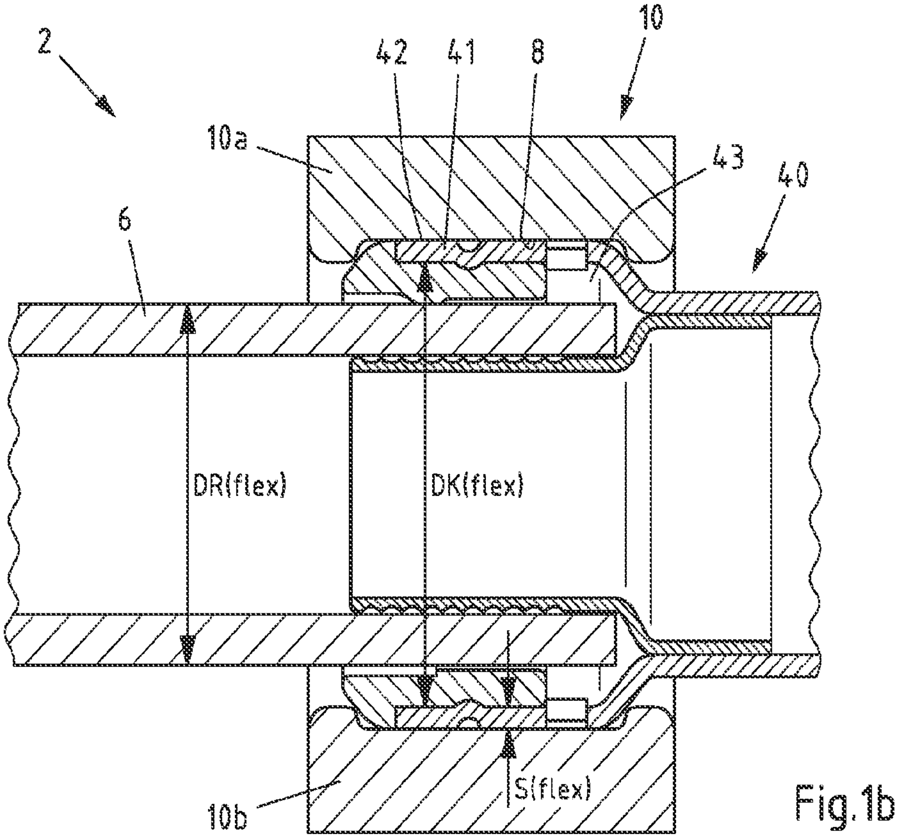

FIGS. 1*a* and 1*b* show a first system 2 according to the invention for connecting rigid pipes 4 and for connecting flexible pipes 6, the pipes 4 and 6 having corresponding outer diameters. The system 2 comprises a press jaw 10 having a press contour 8 with an upper press jaw half 10*a* and a lower press jaw half 10*b*, which is suitable for pressing different fittings 20 and 40, as will be explained below.

Referring to FIG. 1*a*, the system 2 further comprises at least one first fitting 20 for press-fitting to the rigid pipe 4, the at least one first fitting 20 comprising a first press sleeve 21 provided with a first outer contour 22.

Referring further to FIG. 1*b*, the system 2 comprises at least one second fitting 40 for press-fitting to a flexible pipe 6, wherein the at least one second fitting 40 comprises a second press sleeve 41 having a second outer contour 42.

According to the invention, the outer contour 22 of the first press sleeve 21 and the outer contour 42 of the second press sleeve 41 are each adapted at least in sections to the press contour 8 of the press jaw 10 and can be pressed by the press jaw 10.

In FIGS. 1*a* and 1*b*, the above-mentioned components are shown in a sectional view, with an upper press jaw half 10*a* and a lower press jaw half 10*b* in contact with the fittings 20 and 40 before pressing. Further details of the press jaw 10 and the two fittings 20 and 40 are explained in connection with the other figures.

Thus, according to the invention, the same press jaw 10 with the same press contour 8 can be used to press and permanently seal both the first fitting 20 for connecting to a rigid pipe 4 and the second fitting 40 for connecting to a flexible pipe 6. This feature applies in particular to rigid pipes 4 and flexible pipes 6 with the same or at least matching outside diameters.

This reduces the effort on a construction site, since the same press jaw 10 with the same press contour 8 and with the same press tool (not shown) are used for joining rigid pipes 4 and flexible pipes 6 of the same dimensions to generate the necessary press force. While the press tool preferably generates a linear movement of a plunger or piston, the two press jaws 10 are moved towards each other into a closed position by means of a run-in contour, so that the press sleeves 21 or 41 are deformed radially inwards.

In addition, the press jaws can also be designed as parts of a press loop, the protruding ends of which are pressed together by means of a press device in order to thus cause the deformation acting radially inwards.

As has been explained in detail in the introduction, a fitting 20 or 40 is understood to mean in particular a straight connection. Changes of direction in the form of pipe bends, reducers, branches such as T-pieces or crossings with two or more press sections are also possible. Furthermore, a fitting or a pipe connection of a armature can be with only one press section.

As a result of the fact that the outer contour 22 of the first press sleeve 21 and the outer contour 42 of the second press sleeve 41 are each adapted at least in sections to the press contour 8 of the press jaw 10, when the press jaws 10 are moved together, the press contour 8 on the one hand and at least a section of the outer contour 22 of the first press sleeve 21 or the outer contour 42 of the second press sleeve 41 on the other hand increasingly come into contact at least in sections. By moving the press jaws 10 together to a predetermined end position, the press sleeves 21 and 41 are completely pressed and deformed. In the process, the press sleeves 21 and 41 are deformed in the same way by the press jaw 10 in the geometrically corresponding sections. The effect according to the invention that one press jaw 10 is suitable for two different press sleeves 21 and 41 of two fittings 20 and 40 is thus achieved. In particular, the press sleeves 21 and 41 can be largely of the same design.

Furthermore, from FIGS. 1*a* and 1*b*, the dimensions of different sizes are shown to characterise the geometries of the fittings 20, 40 for rigid pipes 4 and for flexible 6 pipes in relation to the geometry of the press jaw 10 before pressing.

Figure 1C:
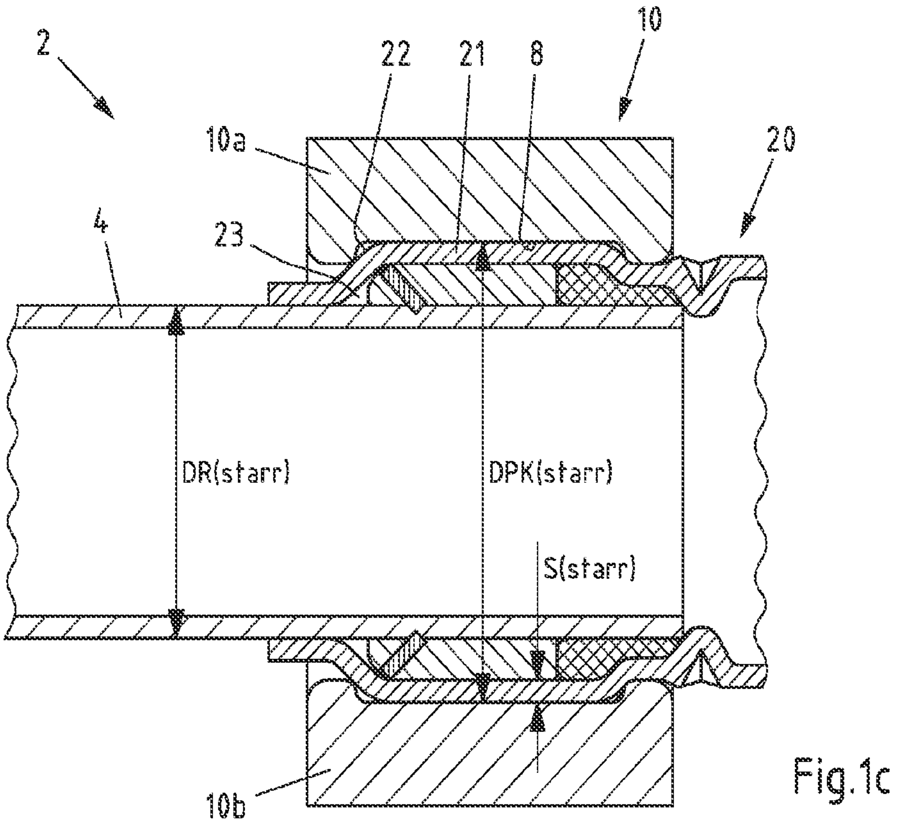
Figure 1D:
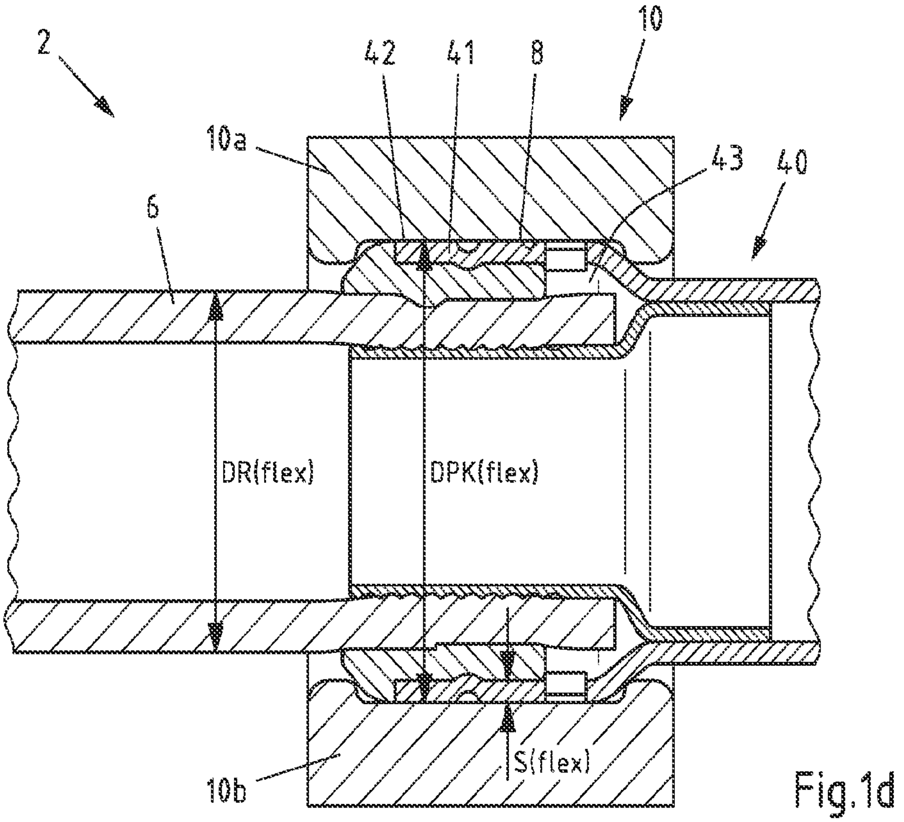
Figure 1E:
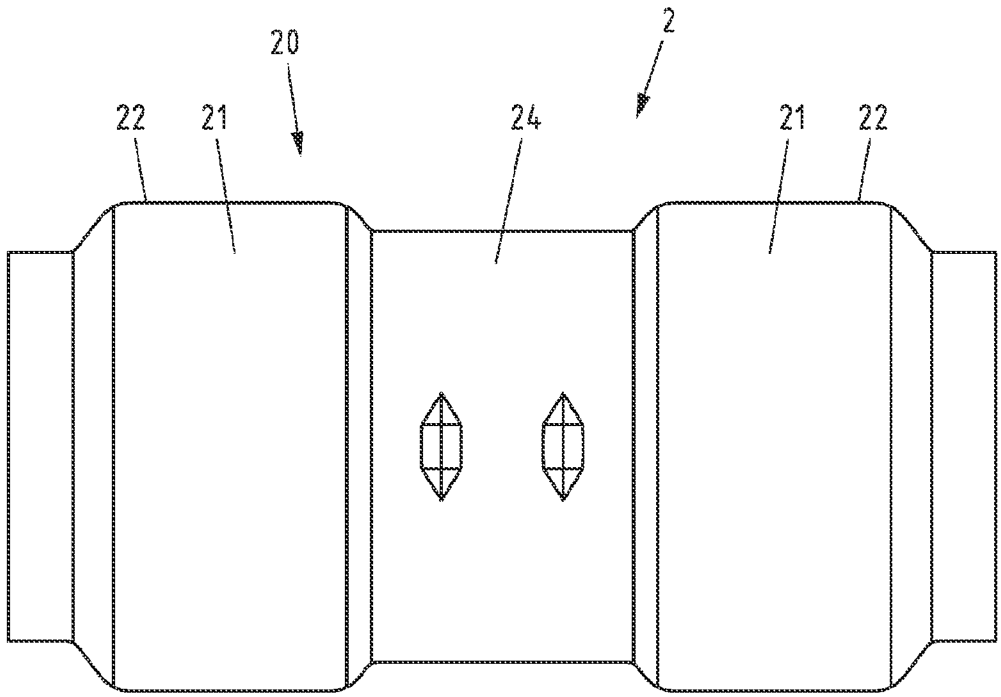
Figure 1F:
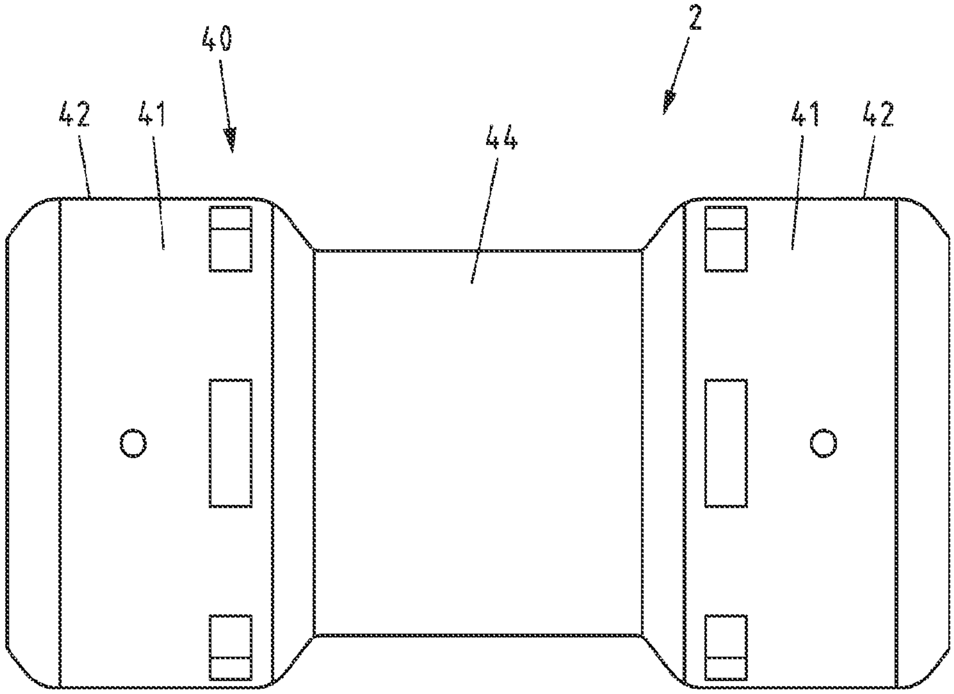

FIGS. 1*c* and 1*d* show the system 2 shown in FIGS. 1*a* and 1*b* for connecting rigid pipes 4 and for connecting flexible pipes 6 in a pressed state. The dimensions of various sizes for characterising the geometries of the fittings 20, 40 for rigid pipes 4 and for flexible pipes 6 in conjunction with the geometry of the press jaw 10 are shown after pressing.

FIG. 1*a* shows, in each case in a state before pressing, the inner diameter DK(starr) of the chamber 23 of the press sleeve 21, the wall thickness s(starr) of the press sleeve 21 in the area of the fitting 20 to be pressed and the outer diameter DR(starr) of the rigid pipe 4 to be accommodated.

In FIG. 1*c*, the inner diameter DPK(starr) of the press contour 8 of the press jaw 10 is drawn in the area of the first fitting 20 to be pressed after pressing.

The dimensions shown in FIGS. 1*a* and 1*c* give the degree of compression β(starr), which is given by $$\beta(starr) = \frac{DK(starr) + 2s(starr) - DPK(starr)}{DR(starr)}.$$

The degree of compression β(starr) preferably assumes values with β(starr)<1.5. For such a degree of compression, it can be ensured that a tight connection with high pull-out strength is achieved and the wrinkling of the pipe to be connected and the fitting is minimised during compression. Preferred for a tight connection with high pull-out strength is a degree of compression β(starr) which assumes values with β(starr)<0.12,particularly preferred β(starr)<0.10.

At a degree of compression β(starr) of 0, corresponding to a degree of compression of 0%, no sealing compression of the fitting with the pipe to be connected takes place. At a degree of compression of 0.15 or higher, corresponding to a degree of compression of 15% or above, the fitting to be pressed or the pipe to be pressed is deformed too much, so that wrinkling of the material to be pressed occurs and the excessive press forces lead to deformation of the fitting to be pressed and the pipe.

FIG. 1*b* shows, in each case in a state before pressing, the inner diameter DK(flex) of the chamber 43 of the press sleeve 41, the wall thickness s(flex) of the press sleeve 41 in the area of the fitting 40 to be pressed and the outer diameter DR(flex) of the flexible pipe 6 to be accommodated.

In FIG. 1*d*, the inner diameter DPK(flex) of the press contour 8 of the press jaw 10 in the area of the second fitting 40 to be pressed after pressing is indicated.

The dimensions shown in FIG. 1_b_ and FIG. 1_d_ give the degree of compression β(flex), which is given by $$\beta(\text{flex}) = \frac{DK(\text{flex}) + 2s(\text{flex}) - DPK(\text{flex})}{DR(\text{flex})}.$$

The degree of compression β(flex) preferably assumes values with β(flex)<0.15. For such a degree of compression, it can be ensured that a tight connection with high pull-out strength is achieved and the wrinkling of the pipe to be connected and the fitting are minimised during compression. Preferred for a tight connection with high pull-out strength is a degree of compression β(flex) which assumes values with β(flex)<0.12, particularly preferred β(flex)<0.10.

Ata degree of compression β(flex) of 0, corresponding to a degree of compression of 0%, no sealing compression of the fitting with the pipe to be connected takes place. Furthermore, it has been shown that at a degree of compression of 0.15 or higher, corresponding to a degree of compression of 15% or more, the fitting to be pressed or the pipe to be pressed is deformed too much, so that wrinkling of the material to be pressed occurs and the excessive press forces lead to deformations of the fitting to be pressed and the pipe.

Looking at FIGS. 1_a_, 1_b_, 1_c_ and 1_d_ together, the dimensions give the ratio τ of the degree of compressions β(starr) and β(flex), where τ is given by $$\tau = \frac{\beta(starr)}{\beta(\text{flex})} = \frac{DK(starr) + 2s(starr) - DPK(starr)}{DK(\text{flex}) + 2s(\text{flex}) - DPK(\text{flex})}\frac{DR(\text{flex})}{DR(starr)}.$$

The ratio τ preferably takes values from a range of values [0.50; 1.50]. For such a ratio τ, a degree of compression as equal as possible can be ensured for the pressing of the fitting to connect a rigid pipe 4 and the pressing of the fitting to connect a flexible pipe 6, so that a tight connection of fitting and pipe to be connected can be achieved for both pressing processes with the same press tool.

In this way, when optimally pressing a fitting with a rigid pipe 4, collapsing or insufficient pressing of a fitting with a flexible pipe 6 can be prevented when pressing with the same press tool, the press jaw 10. At the same time, for an optimal pressing of a fitting with a flexible pipe 6, a collapsing or a too low pressing of a fitting with a rigid pipe 4 can be prevented when pressing with the same press tool. Preferred for an optimal pressing for the connection of a rigid as well as a flexible pipe is a ratio τ, which assumes values from the range [0.75; 1.25], especially preferred [0.80; 1.20].

It has been shown that for a ratio τ with τ<0.5 for optimal compression of a fitting with a rigid pipe 4, the fitting for connection with a flexible pipe 6 is compressed too much when compressed with the same compression tool, resulting in wrinkling and collapse of the flexible pipe 6. On the other hand, for a ratio τ>1.5, optimal compression of a fitting with a rigid pipe 4 results in too little compression of the fitting with a flexible pipe 6 when compressed with the same compression tool. Such a too low compression regularly results in a leakage of the connection of the fitting with a flexible pipe 6 and a too low pull-out strength.

Furthermore, if the ratio τ is τ>1.5 when optimally pressing a fitting with a flexible pipe 6, the fitting for connection with a rigid pipe 4 will be pressed too much when pressed with the same press tool, causing wrinkling and collapsing of the rigid pipe 4. Furthermore, excessive compression of the fitting for connection to a rigid pipe 4 may cause damage to the sealing element and/or other elements within the chamber 23 of the compression sleeve 21. On the other hand, a ratio τ<0.5 when optimally pressing a fitting with a flexible pipe 6 leads to too low a pressing of the fitting with a rigid pipe 4 when pressing with the same press tool. Such a too low compression regularly results in a leakage of the connection of the fitting with a rigid pipe 4 and a too low pull-out strength.

FIGS. 2_a_ and 2_b_ show a second system 102 according to the invention for connecting rigid pipes 4 and for connecting flexible pipes 6, the pipes 4 and 6 having corresponding outer diameters. The system 102 comprises a press jaw half 110_a_ of a press jaw 110 having a press contour 108, which is suitable for pressing different fittings 120 and 140, as will be explained below.

The system 102 comprises at least one first fitting 120 for press-fitting to the rigid pipe 4, the at least one first fitting 120 comprising a first press sleeve 121 provided with a first outer contour 122.

The system 102 further comprises at least one second fitting 140 for press-fitting to a flexible pipe 6, the at least one second fitting 140 comprising a second press sleeve 141 having a second outer contour 142.

According to the invention, the outer contour 122 of the first press sleeve 121 and the outer contour 142 of the second press sleeve 141 are each adapted at least in sections to the press contour 108 of the press jaw 110 and can be pressed by the press jaw 110.

In contrast to the first system 2, in the system 102 the first press sleeve 121 has a first additional press section 121_a_ and the second press sleeve 141 has a second additional press section 141_b_. As can be seen in FIG. 2, the first additional press section 121_a_ and the second additional press section 141_b_ have outer contours which differ from one another and which can each be formed in sections by the press jaw 110 and its press contour 108 with corresponding sections 108_a_ and 108_b_. Thus, it is possible to mould different functionalities into the press sleeves 121 and 141 for rigid pipes 4 and flexible pipes 6 with the same press jaw 110. Furthermore, since the press sleeves 121 and 141 have matching press sections 121_c_ and 141_c_, they are deformed in the same way by the same section 108_c_ of the press contour 108 of the press jaw 110 during pressing.

FIG. 1_e_ and if show both fittings 20 and 40 in a side view. The outer contours 22 and 42 of the two press sleeves 21 and 41 match, so that the same press jaw 10 can be used for pressing the press sleeves 21 and 41. The same correspondences of the press sleeves 121 and 141 are shown in the corresponding FIGS. 2_e_ and 2_f_ for the fittings 120 and 140.

As shown in FIGS. 1_a_ to 2_f_, the press sleeves 22, 122 and 42, 142 each have a chamber 23, 123 and 43, 143 facing inwards towards the pipe 4 or 6 to be accommodated for accommodating further functional elements required for pressing and sealing the connection, the different shapes and functions of which are explained in connection with the other figures. The chambers 23, 123 and 42, 142, which are identical or similar, therefore each accommodate different functional elements.

By analogy with FIGS. 1_a_ and 1_b_, FIGS. 2_a_ and 2_b_ show the dimensions of various sizes used to characterise the geometries of the fittings 120, 140 for rigid pipes 4 and for flexible 6 pipes in relation to the geometry of the press jaw 10 before pressing.

Further, in analogy to FIGS. 1_c_ and 1_d_, FIGS. 2_c_ and 2_d_ show the system 102 shown in FIGS. 2_a_ and 2_d_ for connecting rigid pipes 4 and for connecting flexible pipes 6 in a pressed state. The dimensions of various sizes characterising the geometries of the fittings 120, 140 for rigid pipes 4 and for flexible pipes 6 in conjunction with the geometry of the press jaw 110 are shown after pressing.

Figure 2A:
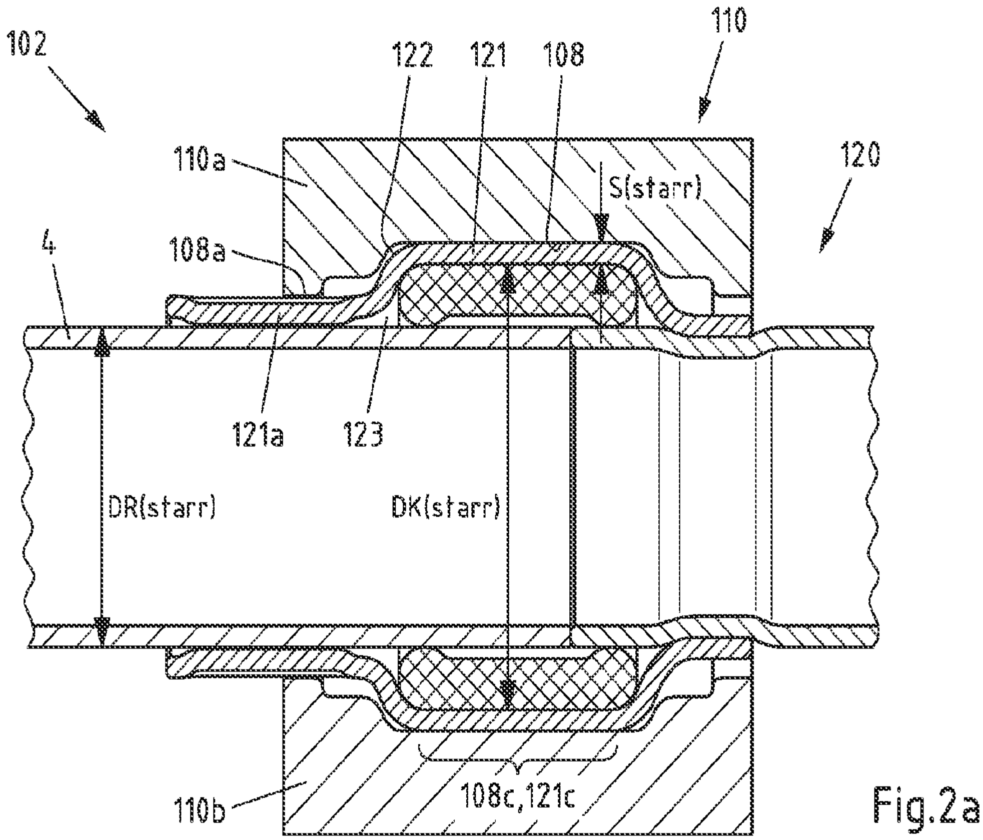

FIG. 2*a* shows, in each case in a state before pressing, the inner diameter DK(starr) of the chamber 123 of the press sleeve 121, the wall thickness s(starr) of the press sleeve 121 in the area of the fitting 120 to be pressed and the diameter DR(starr) of the rigid pipe 4 to be accommodated.

Figure 2B:
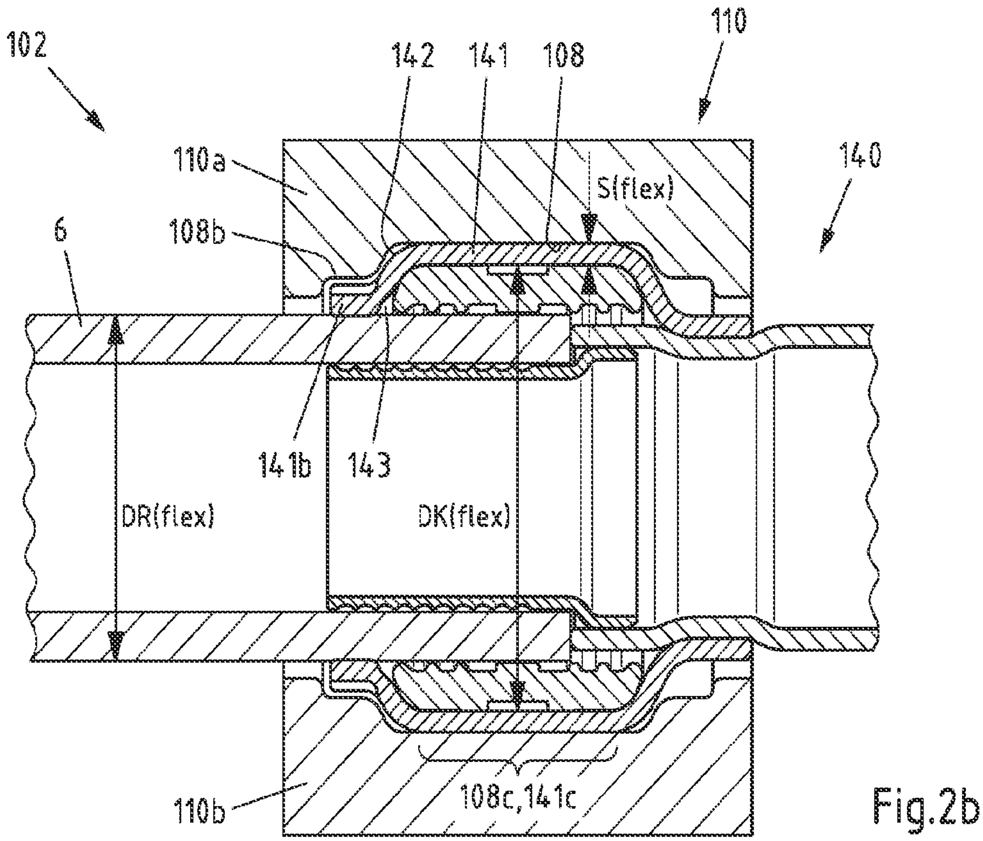
Figure 2C:
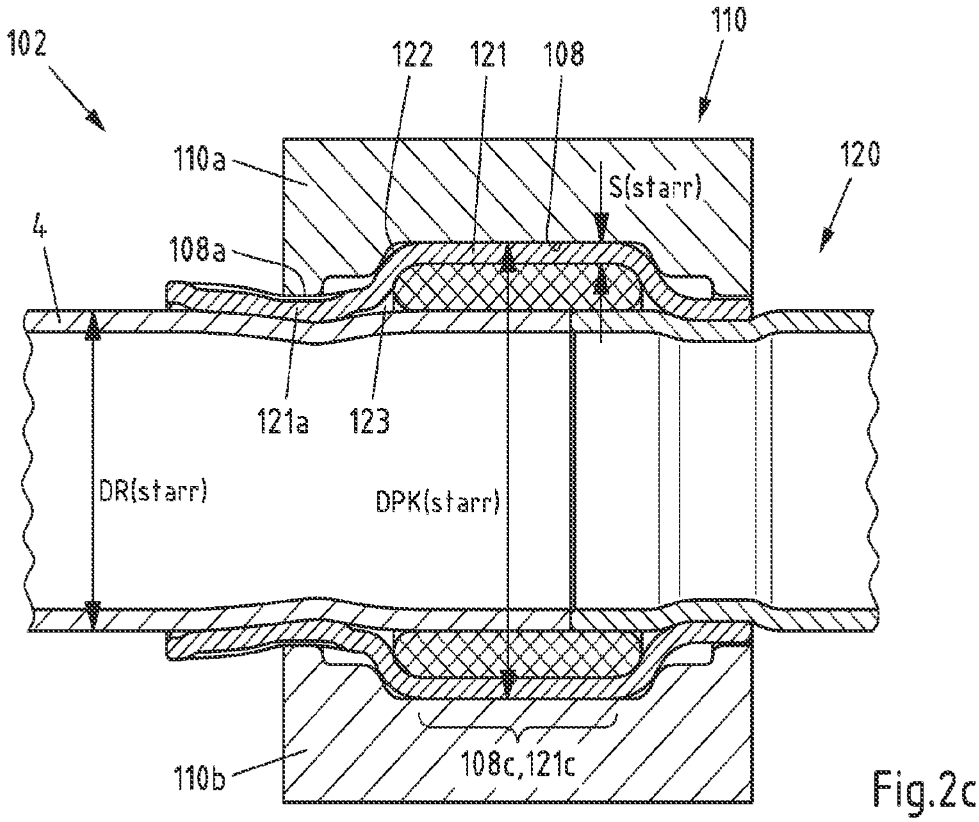

In FIG. 2*c*, the inner diameter DPK(starr) of the press contour 108 of the press jaw 110 in the area of the first fitting 120 to be pressed after pressing is indicated.

The dimensions given in FIGS. 2*a* and 2*c* give the degree of compression β (starr) already described in relation to FIG. 1, which is given by $$\beta(starr) = \frac{DK(starr) + 2s(starr) - DPK(starr)}{DR(starr)}.$$

FIG. 2*b* shows, in each case in a state before pressing, the inner diameter DK(flex) of the chamber 143 of the press sleeve 141, the wall thickness s(flex) of the press sleeve 141 in the area of the fitting 140 to be pressed and the diameter DR(flex) of the flexible pipe 6 to be accommodated.

Figure 2D:
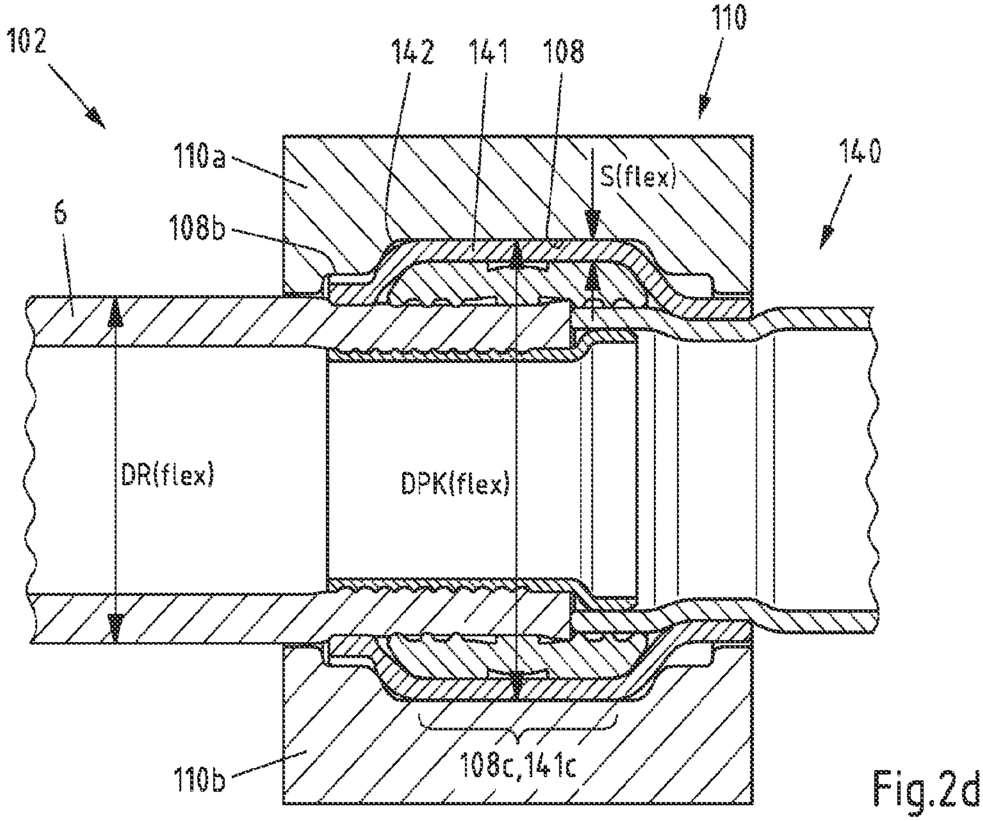
Figure 2E:
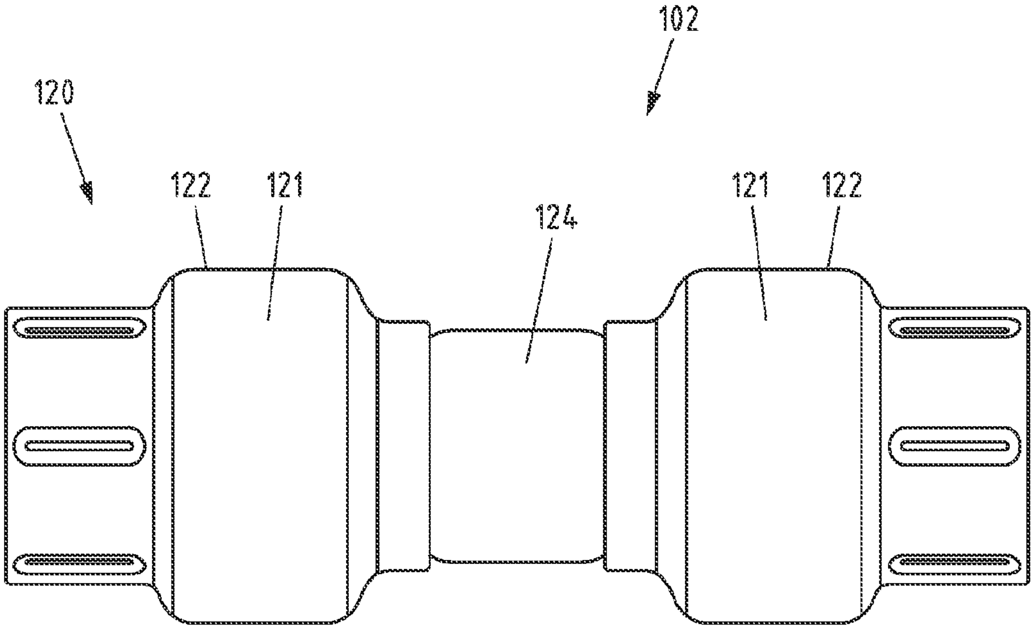
Figure 2F:
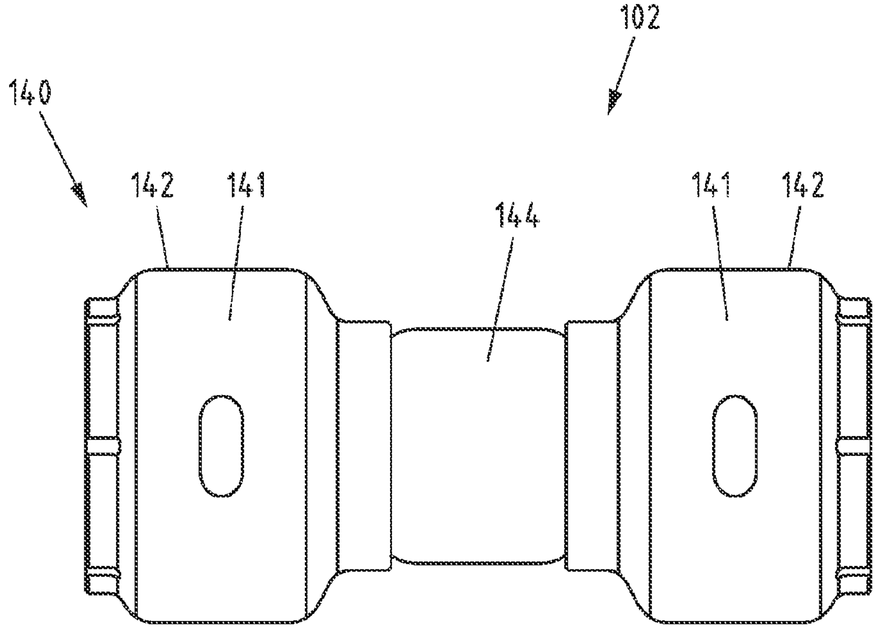

In FIG. 2*d*, the inner diameter DPK(flex) of the press contour 108 of the press jaw 110 in the area of the second fitting 140 to be pressed after pressing is indicated.

The dimensions shown in FIG. 2*b* and FIG. 2*d* give the degree of compression β(flex) already described in relation to FIG. 1, which is given by $$\beta(\text{flex}) = \frac{DK(\text{flex}) + 2s(\text{flex}) - DPK(\text{flex})}{DR(\text{flex})}.$$

FIGS. 3*a* to 3*i* show examples of embodiments of the first system 2 according to the invention as shown in FIG. 1 for determining different sizes for characterising the geometries of the fittings for rigid pipes and for flexible pipes. In this case, the fittings are shown only with press sleeve 21 or 41 and inserted pipe 4 or 6, but without the elements inside the fitting necessary for pressing. In the following, the sizes are determined on the basis of the dimensions of the chambers 23 or 43, such as height, length and volume.

Figure 3A:
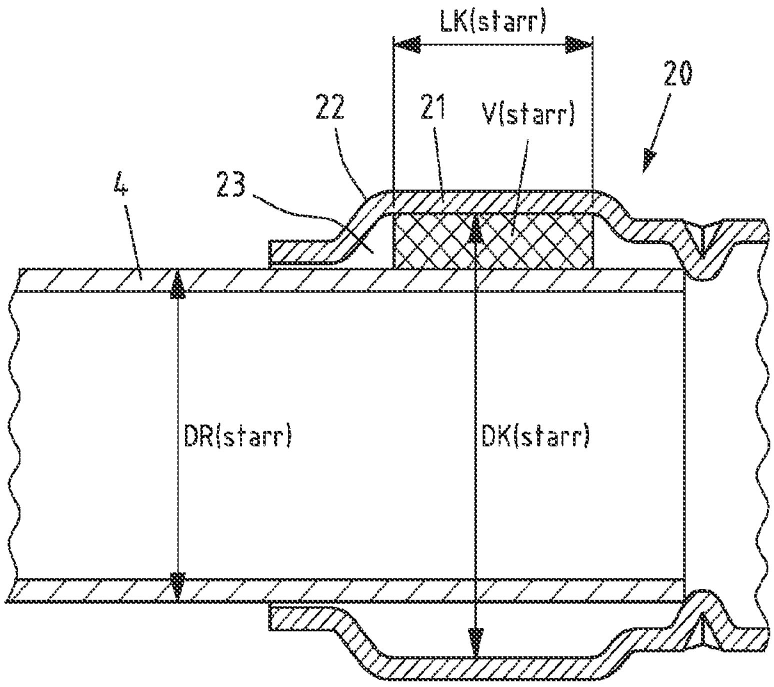

FIG. 3*a* first shows a first fitting 20 for pressing a rigid pipe 4 with a press sleeve 21 having an inwardly directed chamber 23. As can be seen in FIG. 3*a*, the chamber length LK(starr) is defined as the length of the section of the chamber 23 where the outer contour 22 of the chamber 23 is substantially plane-parallel to the outer shell of the rigid pipe 4 surrounded by the fitting 20. Consequently, LK(starr) is defined as the length of the section that lies between the sections of the outer contour 22 of the chamber 23 that are curved towards the pipe 4.

It is further evident that the inner diameter DK(starr) of the chamber 23 is defined without adding the wall thickness of the chamber 23, whereas the outer diameter DR(starr) of the rigid pipe 4 to be accommodated is defined by adding the wall thickness of the pipe 4. Thus, the height of the chamber 23 is given by the difference DK(starr)-DR(starr). This results in a chamber volume $$V(starr) = \frac{\pi \cdot LK(starr)}{4} \cdot \left(DK(starr)^2 - DR(starr)^2\right).$$

Figure 3B:
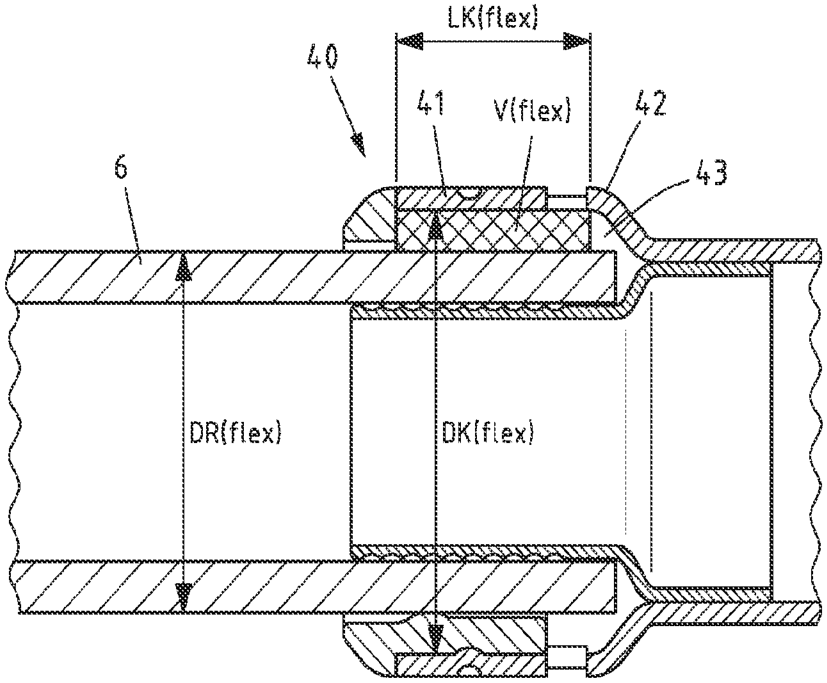

FIG. 3*b* shows a second fitting 40 for pressing a flexible pipe 6 with a press sleeve 41 having an inwardly directed chamber 43. Analogous to FIG. 3*a*, it can be seen in FIG. 3*b* that the chamber length LK(flex) is defined as the length of the section of the chamber 43 where the outer contour 42 of the chamber 43 is substantially plane-parallel to the outer shell of the flexible pipe 6 surrounded by the fitting 40. Consequently, LK(flex) is defined as the length of the section that lies between the sections of the outer contour 42 of the chamber 43 that are curved towards the pipe 6.

Furthermore, it can be seen that the inner diameter DK(flex) of the chamber 43 is defined without adding the wall thickness of the chamber 43, whereas the outer diameter DR(flex) of the flexible pipe 6 to be accommodated is defined by adding the wall thickness s(flex) of the pipe 6. Thus, the height of the chamber 43 is given by the difference DK(flex)-DR(flex). This results in a chamber volume $$V(\text{flex}) = \frac{\pi \cdot LK(\text{flex})}{4} \cdot \left(DK(\text{flex})^2 - DR(\text{flex})^2\right).$$

From these chamber volumes, the ratio $$\delta = \frac{V(starr)}{V(\text{flex})}$$

be formed.

From the mentioned dimensions according to FIGS. 3*a* and 3*b*, the ratios ε(starr) and ε(flex) of the chamber height and chamber length can also be formed.

ε(starr) is thereby defined by $$\varepsilon(starr) = \frac{DK(starr) - DR(starr)}{2 \cdot LK(starr)}.$$

ε(flex) is defined by $$\varepsilon(\text{flex}) = \frac{DK(\text{flex}) - DR(\text{flex})}{2 \cdot LK(\text{flex})}.$$

Furthermore, the ratio α can also be calculated by $$\alpha = \frac{\varepsilon(starr)}{\varepsilon(\text{flex})} = \frac{LK(\text{flex})}{LK(starr)} \cdot \frac{(DK(starr) - DR(starr))}{(DK(\text{flex}) - DR(\text{flex}))}.$$

wherein α assumes values from a range of values [0.50; 3.00], preferably [0.50; 1.50], particularly preferably [0.75; 1.25].

Thus, α indicates the ratio of the chamber height ((DK (starr)-DR(flex)/2) and chamber length DK(starr) of the press sleeve 21 of a fitting 20 for pressing rigid pipes 4 and of the chamber height ((DK(starr)-DR(flex)/2) and length DK(starr) of the press sleeve 41 of a fitting 40 for pressing flexible pipes 6.

FIGS. 3*c* to 3*i* now each show a pair formed from a first fitting 20 shown in FIG. 3*a* and a second fitting 40 shown in FIG. 3*b*, wherein the varying dimensions of the fittings 20 and 40 result in different values for the ratio of the chamber volumes or for the ratio of the chamber height to the chamber length of the chambers 23, and 43, wherein both ratios are given by δ are given.

Figure 3C:
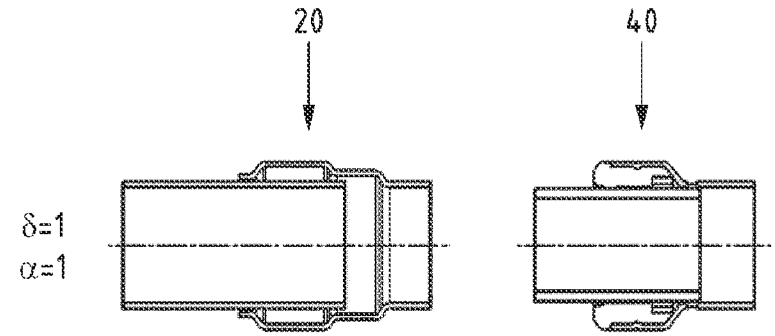

With a ratio of δ=1 or α=1 according to FIG. 3*c*, the inner space of the chambers 23, 43 offers sufficient space for the elements to be received by the chamber 23, 43, for example an O-ring or a claw ring. In addition, an optimal degree of compression can be ensured for both the first fitting 20 and the second fitting 40.

Figure 3D:
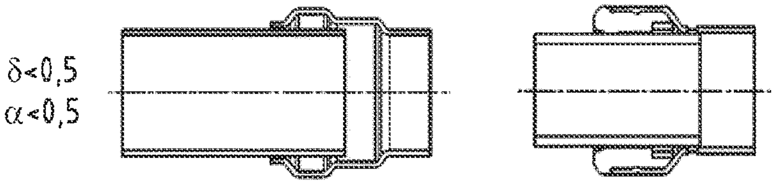
Figure 3E:
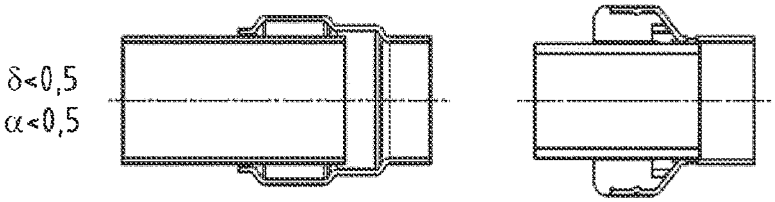
Figure 3F:
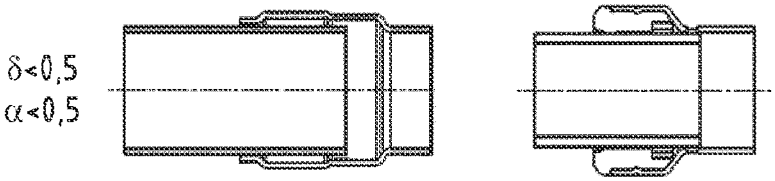

FIG. 3*d* to FIG. 3*f* show examples of dimensions resulting in a ratio of δ<0.5 or α<0.5. Such selected dimensions result in either a too short chamber length of chamber 23 of first fitting 20, as shown in FIG. 3*d*, or a too low chamber height of chamber 23, as shown in FIG. 3*f*, leaving no space for elements to be received by chamber 23, or a too high chamber height of chamber 43 of second fitting 40 resulting in a too high degree of compression, as shown in FIG. 3*e*.

Figure 3G:
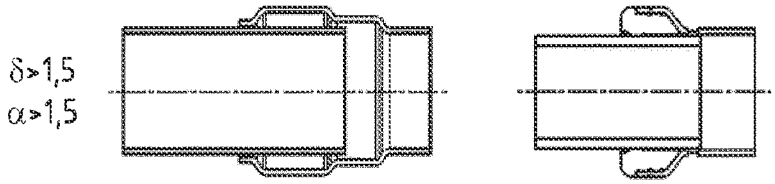
Figure 3H:
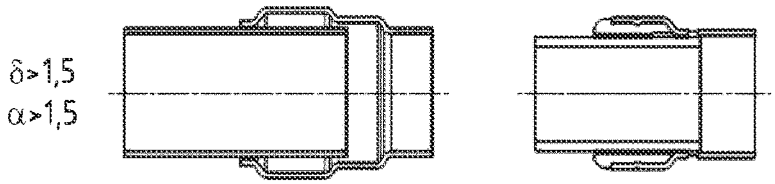
Figure 3I:
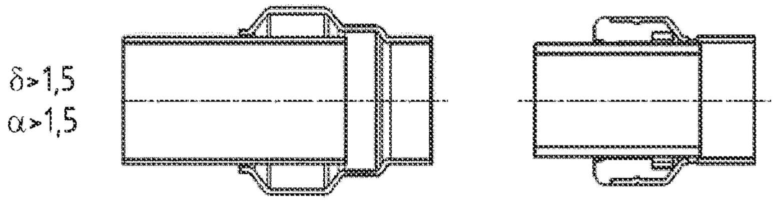

FIG. 3*g* to FIG. 3*i* show examples of dimensions resulting in a ratio of δ>1.5 or α>1.5. Such selected dimensions result in either too short a chamber length of chamber 43 of second fitting 40, as shown in FIG. 3*g*, or too low a chamber height of chamber 43 of second fitting 40, as shown in FIG. 3*h*, leaving no space for elements to be received by chamber 43, or too high a chamber height of chamber 23 of first fitting 20 resulting in too high a degree of compression, as shown in FIG. 3*i*.

In other embodiments of the fittings, the limit values 0.5<=δ<=3.00 or 0.5<=α<=3.00 may also apply.

Figure 3J:
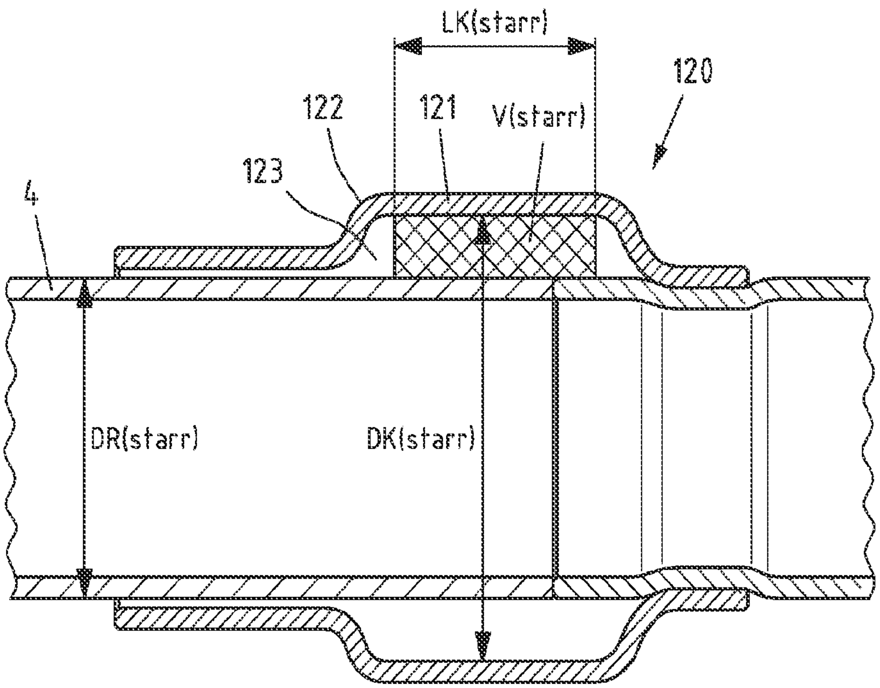
Figure 3K:
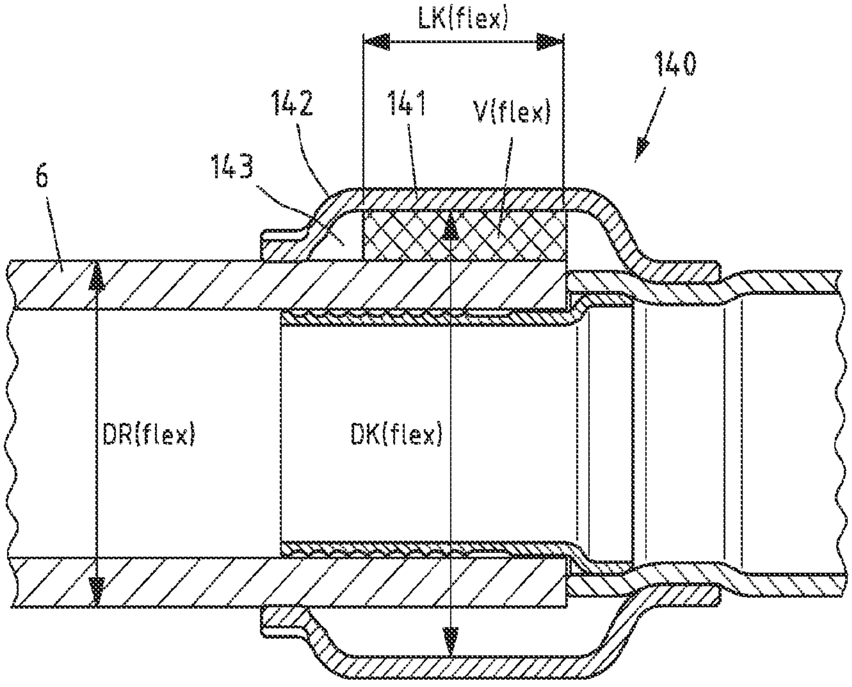
Figure 3L:
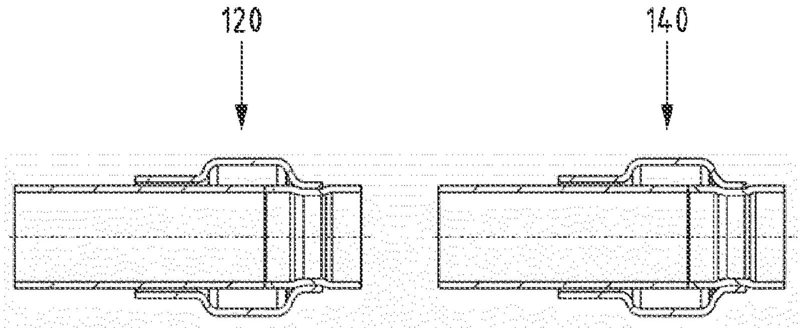

FIGS. 3*j* and 3*k* show embodiments of the second system 102 according to the invention with the fittings 120 and 140.

FIG. 3*j* first shows a first fitting 120 for pressing a rigid pipe 4 with a press sleeve 121 having an inwardly directed chamber 123. As can be seen in FIG. 3*j*, the chamber length LK(starr) is defined as the length of the portion of the chamber 123 where the outer contour 122 of the chamber 123 is substantially plane-parallel to the outer shell of the rigid pipe 4 surrounded by the fitting 120. Consequently, LK(starr) is defined as the length of the portion lying between the portions of the outer contour 122 of the chamber 123 curved towards the pipe 4. It is further apparent that the chamber diameter DK(starr) is defined without adding the wall thickness of the chamber 123, whereas DR(starr), the diameter of the rigid pipe 4 to be accommodated, is defined with the addition of the wall thickness of the pipe 4. Thus, by the difference DK(starr)-DR(starr) the height of chamber 123 is given.

FIG. 3*k* shows a second fitting 140 for pressing a flexible pipe 6 with a press sleeve 141 having an inwardly directed chamber 143. Analogous to FIG. 3*j*, it can be seen in FIG. 3*k* that the chamber length LK(flex) is defined as the length of the portion of the chamber 143 where the outer contour 142 of the chamber 143 is substantially plane-parallel to the outer shell of the flexible pipe 6 surrounded by the fitting 140. Consequently, LK(flex) is defined as the length of the portion lying between the portions of the outer contour 142 of the chamber 143 curved towards the pipe 6. It is further apparent that the chamber diameter DK(flex) is defined without adding the wall thickness of the chamber 143, whereas DR(flex), the diameter of the flexible pipe 6 to be accommodated, is defined with the addition of the wall thickness s(flex) of the pipe 6. Thus, the difference DK(flex)-DK(flex) gives the height of the chamber 143.

For the fittings 120 and 140, these definitions result in the chamber volumina $$V(starr) = \frac{\pi \cdot LK(starr)}{4} \cdot \left(DK(starr)^2 - DR(starr)^2\right).$$

and $$V(\text{flex}) = \frac{\pi \cdot LK(\text{flex})}{4} \cdot \left(DK(\text{flex})^2 - DR(\text{flex})^2\right),$$

and their relationship $$\delta = \frac{V(starr)}{V(\text{flex})}.$$

Likewise, α is given by $$\alpha = \frac{\varepsilon(starr)}{\varepsilon(\text{flex})}$$

and gives the ratio of the ratio of the chamber height ((DK(starr)-DR(flex)/2) and chamber length DK(starr) of the press sleeve 121 of a fitting 120 for pressing rigid pipes 4 and of the ratio of the chamber height ((DK(starr)-DR (flex)/2) and length DK(starr) of the press sleeve 141 of a fitting 140 for pressing flexible pipes 6.

FIG. 3*l* to FIG. 3*r* now each show a pair formed from a first fitting 120 shown in FIG. 3*j* and a second fitting 140 shown in FIG. 3*k*, wherein the varying dimensions result in different values for the ratio of the chamber volumes and for the ratio of the chamber height to chamber length, wherein both ratios are indicated by δ and α respectively.

With a ratio of δ=1 or α=1 as shown in FIG. 31, the inner space of the chambers 123, 143 provides sufficient space for the elements to be received by the chamber 123, 143, for example a sealing element. In addition, an optimal degree of compression can thus be ensured for both the first fitting 120 and the second fitting 140.

Figure 3M:
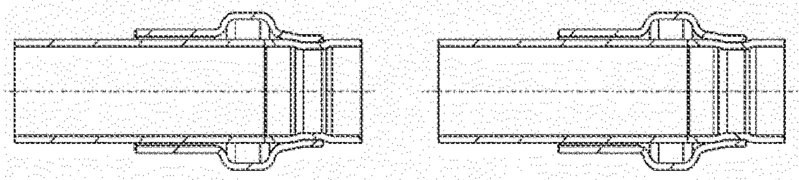
Figure 3N:
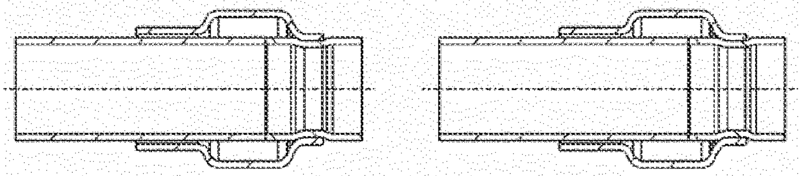
Figure 3O:
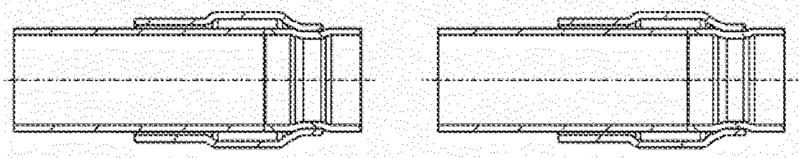

FIG. 3*m* to FIG. 3*o* show examples of dimensions resulting in a ratio of δ<0.5 or α<0.5. Such selected dimensions result in either too short a chamber length of chamber 123 of first fitting 120, as shown in FIG. 3*m*, or too low a chamber height of chamber 123, as shown in FIG. 3*o*, leaving no space for elements to be received by chamber 123, or too high a chamber height of chamber 143 of second fitting 140 resulting in too high a degree of compression, as shown in FIG. 3*n*.

Figure 3P:
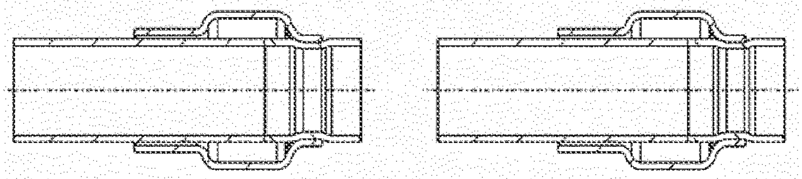
Figure 3Q:
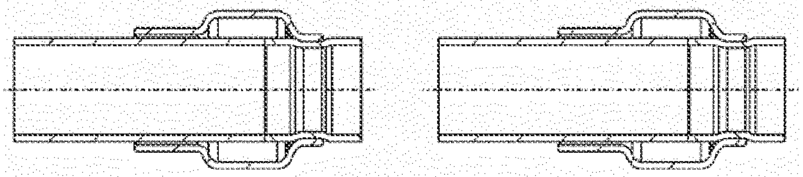
Figure 3R:
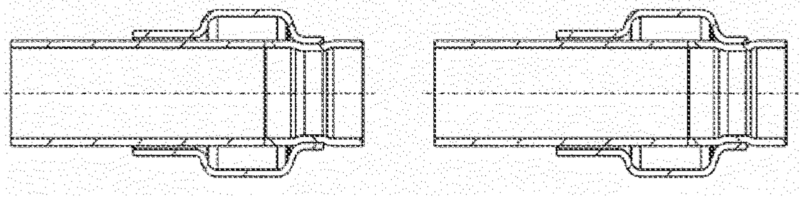

FIG. 3*p* to FIG. 3*r* show examples of dimensions resulting in a ratio of δ>1.5 or α>1.5. Such selected dimensions result in either too short a chamber length of chamber 143 of second fitting 140, as shown in FIG. 3*p*, or too low a chamber height of chamber 143 of second fitting 140, as shown in FIG. 3*q*, leaving no space for elements to be received by chamber 143, or too high a chamber height of chamber 123 of first fitting 120 resulting in too high a degree of compression, as shown in FIG. 3*r*.

In other embodiments of the fittings, the limit values 0.5<=δ<=3.00 or 0.5<=α<=3.00 may also apply.

In the following, the individual embodiments of the fittings 20, 120 and 40, 140 are explained in detail with the aid of further figures.

FIGS. 4*a* to 4*e* show a first embodiment of a fitting 20 for connecting to a rigid pipe 4 for a system 2 previously explained with reference to FIGS. 1*a* to 1*f*. The fitting has a base body 24 and an inwardly projecting stop element 25 formed circumferentially in the base body 24. Furthermore, a press sleeve 21 connected to the base body 24 and forming an outer contour 22 is provided, which has a chamber 23 directed inwards towards the pipe 4 to be accommodated. A clamp ring 26 consisting of a plastic material with a plurality of clamp elements 27 aligned against the pull-out direction of the pipe 4 to be inserted is arranged in the chamber 23. In addition, a sealing element 28 with a round section 28*a* and a flat section 28*b* forming a lip seal is arranged in the chamber 23 adjacent to the stop element 25.

The press sleeve 21 is integrally connected to the base body 24, so that the press section in the form of the press sleeve 21 and the base body 24 can be manufactured in one piece in an advantageous manner.

Figure 4A:
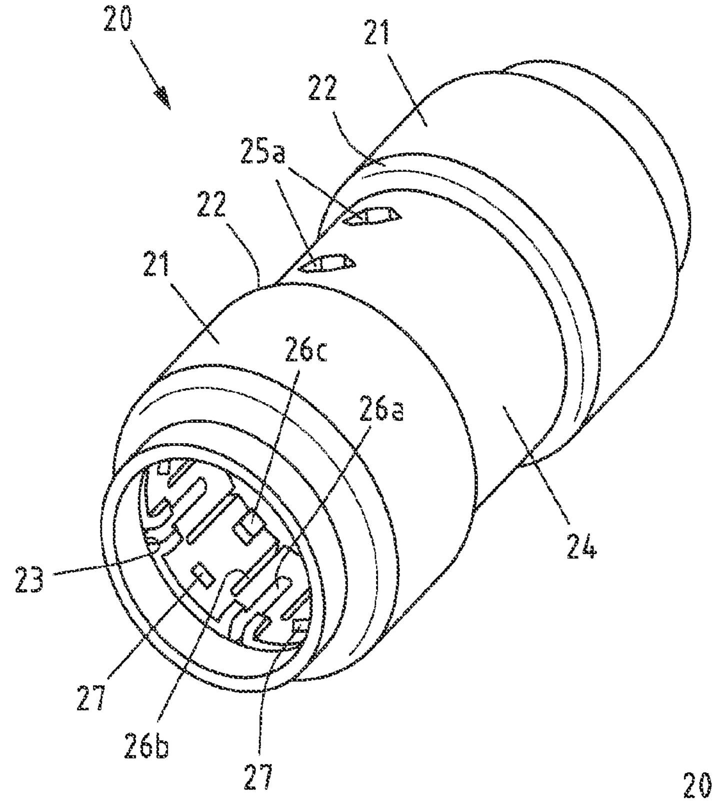
Figure 4B:
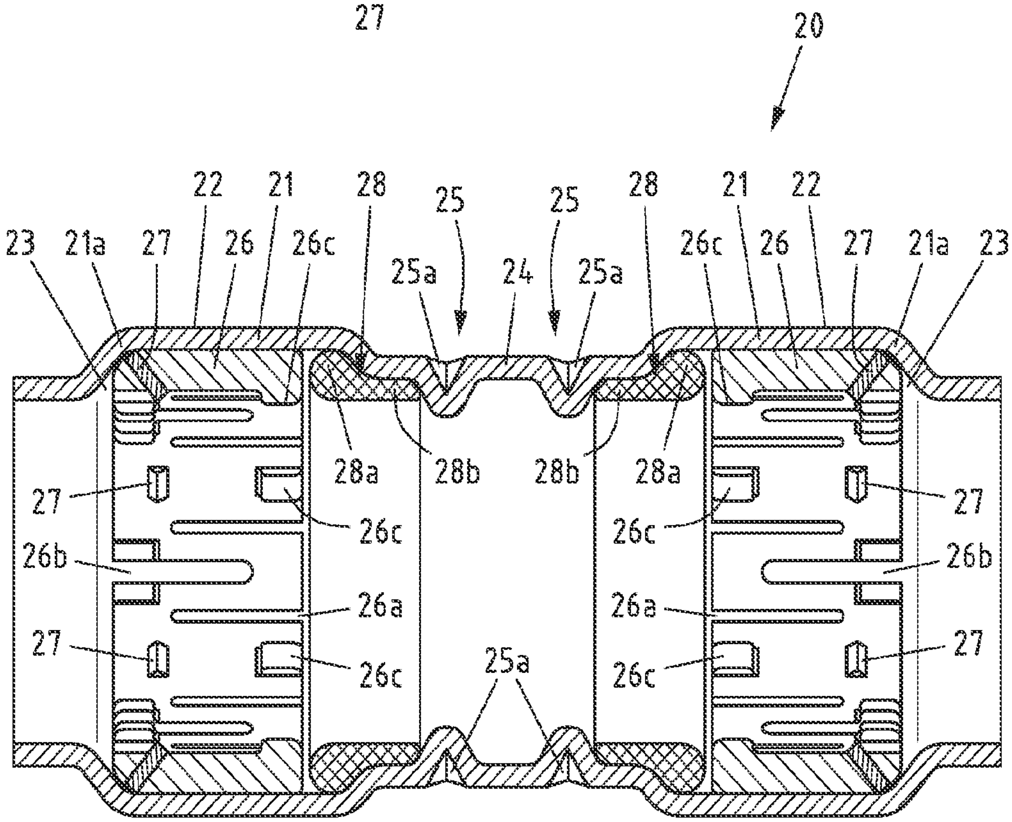
Figure 4C:
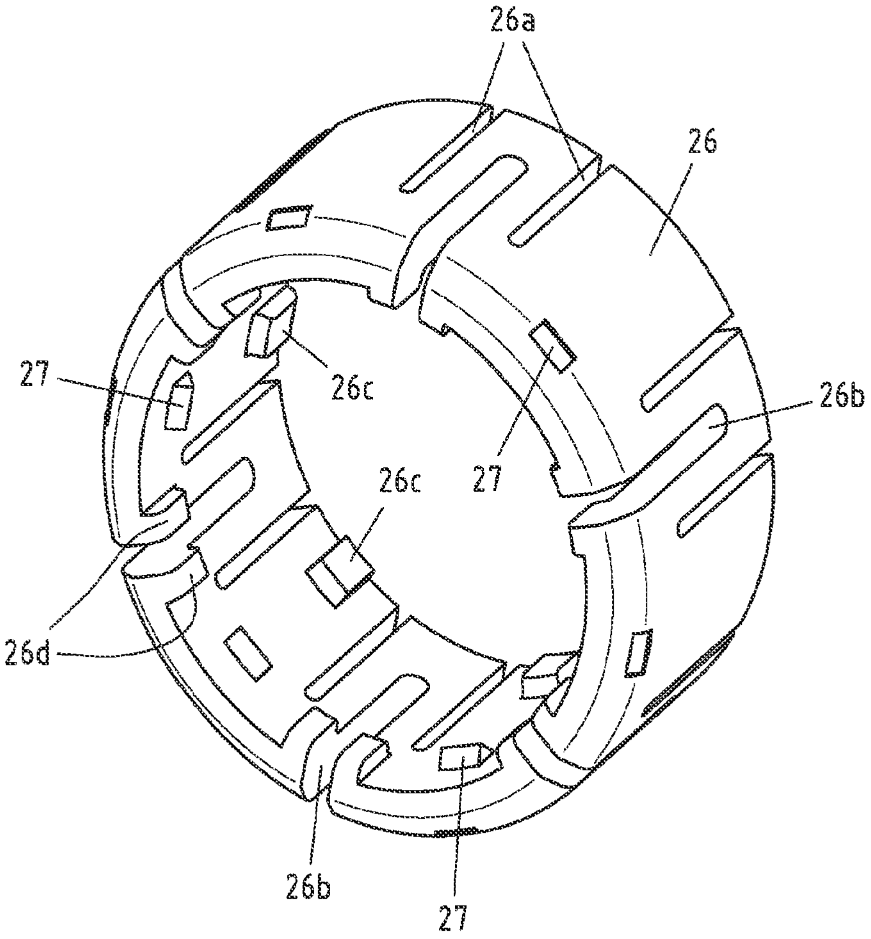

The stop element 25 consists of two inwardly directed and radially opposite recesses 25*a*, which are designed, for example, as punch marks. The pipe stop is thus punctual and not circumferential, wherein dead spaces are avoided, even if a pipe 4 is inserted and the seal 28 seals in the area of the stop element 25. In FIG. 4*b*, a pair of radially opposite punch marks is shown for each side of the fitting 20, one pair for each fitting side.

The pipe 4 is secured against being pulled out and/or against excessive internal pressure by means of the clamp ring 26, which is designed as a plastic clamp ring and in which metallic cutting blades are arranged as clamp elements 27. The plastic clamp ring 26 also has circumferential slots 26*a* and 26*b* which make the clamp ring 26 flexible overall and thus facilitate assembly in the fitting 20 within the press sleeve 21. In addition, the clamp ring 26 can thereby be formed as a circumferentially closed ring and can be more easily reduced in radius during pressing.

The clamp elements 27 are designed as cutting blades in the form of wire elements which are inserted into recesses provided for this purpose. The clamp elements 27 are thus positively fixed in the plastic of the clamp ring 26. The clamp elements 27 can be manufactured in various ways, for example as castings or stampings. The number of clamp elements 27 is six, but can be determined according to the requirements or dimensions of the clamp ring 27.

Figure 4D:
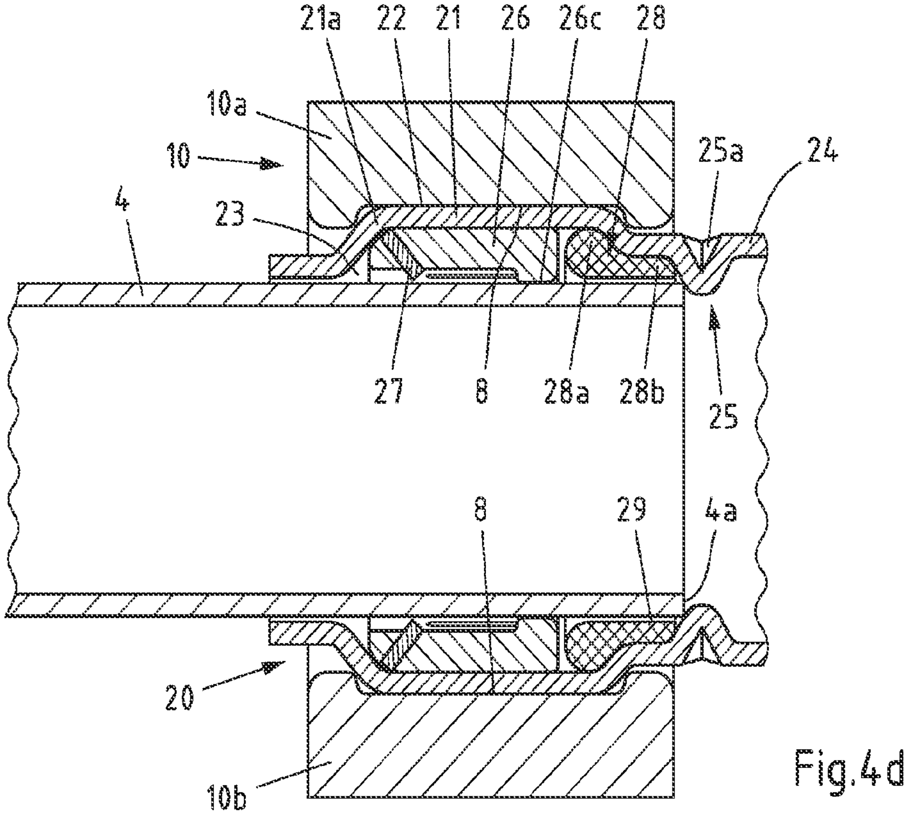
Figure 4E:
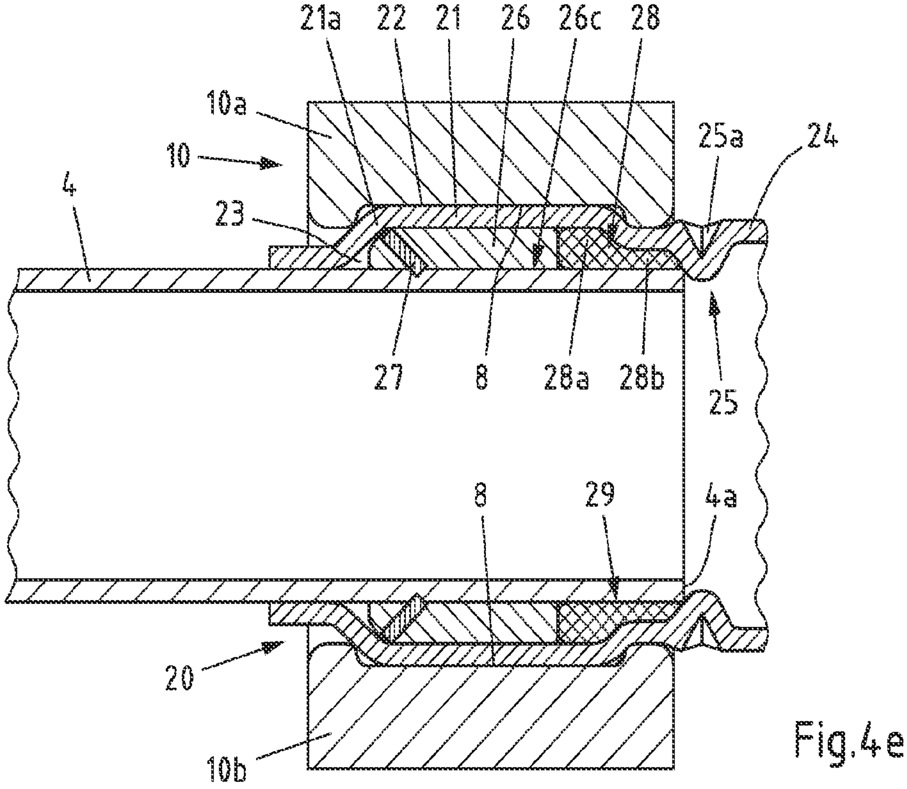

Furthermore, the clamp elements 27 are arranged in the distal area of the chamber 23 opposite the stop elements 25 and absorb the pull-out force by the clamp elements 27 deforming the pipe 4 punctually, see FIG. 4*e*, and thereby bearing against the wall in a distal outer corner area 21*a* of the press sleeve 21. This ensures a direct flow of force from the pipe 4 via the press sleeve 21 into the fitting 4. After pressing, the clamp ring 26 has only a supporting function and contributes only slightly or not at all to the pull-out protection.

Furthermore, the clamp ring 26 has inwardly directed webs 26*c* spaced from the clamp elements 27, the webs 26*c* defining an inner cross-section that is equal to or slightly smaller than the outer diameter of the pipe 4. The webs 26*c* hold the pipe 4 in the unpressed state of the fitting 20 according to FIG. 4*d*, so that the pipe 4 cannot slip out of the fitting 20. In addition, inwardly directed webs 26*d* are also formed to guide a pipe 4 to be inserted during insertion.

In addition, the webs 26*c* form a guide for the pipe 4 when it is pushed into the fitting 20. If the internal cross-section of the internal surfaces of the webs 26*c* is slightly smaller than the external diameter of the pipe 4, the pipe 4 is offered a low resistance when it is pushed in. Thus, when the pipe 4 is pushed in, the user receives haptic feedback that the pipe 4 is inserted into the fitting.

The seal 28 is designed as a lip seal with sections 28*a* and 28*b* and seals the gap 29 between the pipe 4 and the press sleeve 21 up to the end 4*a* of the inserted pipe 4 after pressing. For this purpose, the seal 28 lies on the one hand with the round section 28*a* inside the chamber 23 against an inclined section and is thereby positioned. The flat section 28*b* is positioned between the press sleeve 21 and the pipe 4 to be inserted, which is particularly evident in the pressed state in FIG. 4*e*. After pressing, the gap 29 is thus filled.

The press process becomes clear by comparing FIGS. 4*d* and 4*e*. The two press jaw halves 10*a* and 10*b* are moved radially inwards and the press sleeve 21 is deformed radially inwards by the contact of the press contour 8 of the two press jaw halves 10*a* and 10*b*. On the one hand, this deforms the clamp ring 26 in such a way that the clamp elements 27 press inwards into the material of the pipe 4 and thus the fixing of the pipe 4 with the fitting 20 is achieved. On the other hand, the deformation of the press sleeve 21 also deforms the seal 28 and in particular the section 28*b* as a lip seal radially inwards and the seal 28 seals the gap 29.

The sealing element 28 thus ensures a high level of hygiene and prevents crevice corrosion. Thus, in conjunction with the punctual pipe stop 25, dead spaces in which media can collect are avoided. The lip seal also ensures system tightness.

FIGS. 5*a* to 5*e* show a fitting 40 for connection to a flexible pipe 6 for a system 2 according to FIGS. 1*a* to 1*f*. The fitting 40 has a base body 44 and a press sleeve 41 connected thereto and forming an outer contour 42. The press sleeve 41 forms a chamber 43 directed inwards towards the pipe 6 to be accommodated, in which a force transmission ring 46 is arranged. Furthermore, a support body 50 is provided which is connected to the base body 44 and is provided with a sealing contour 48 directed outwards towards the pipe 6 to be inserted.

Figure 5A:
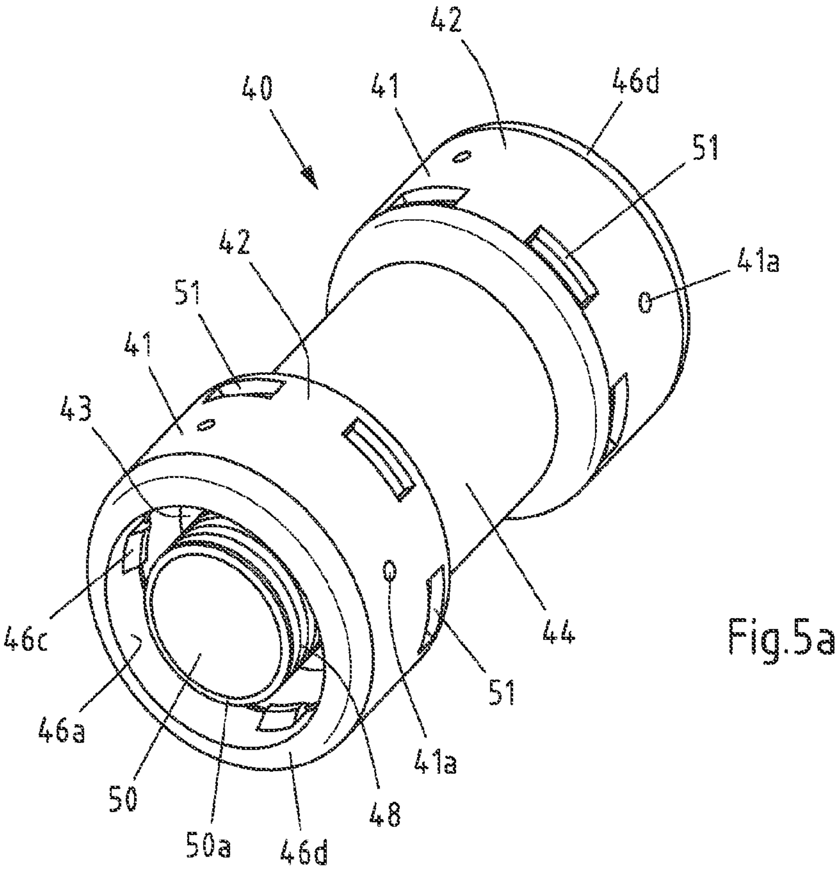
Figure 5B:
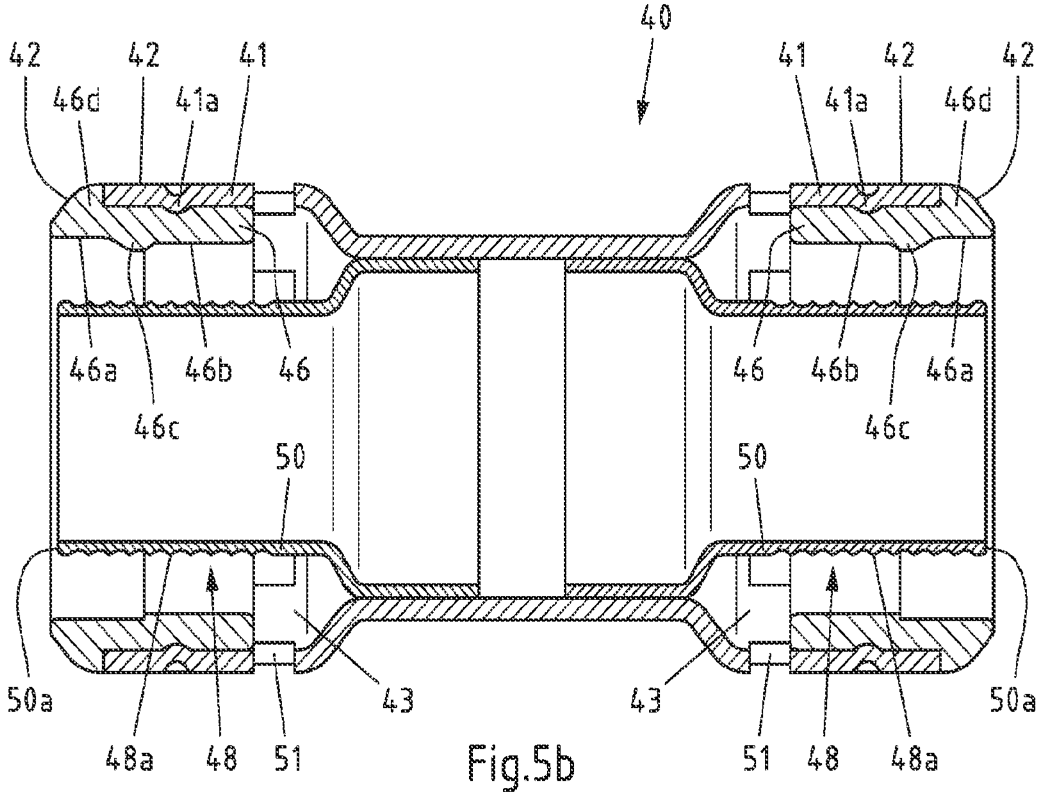
Figure 5C:
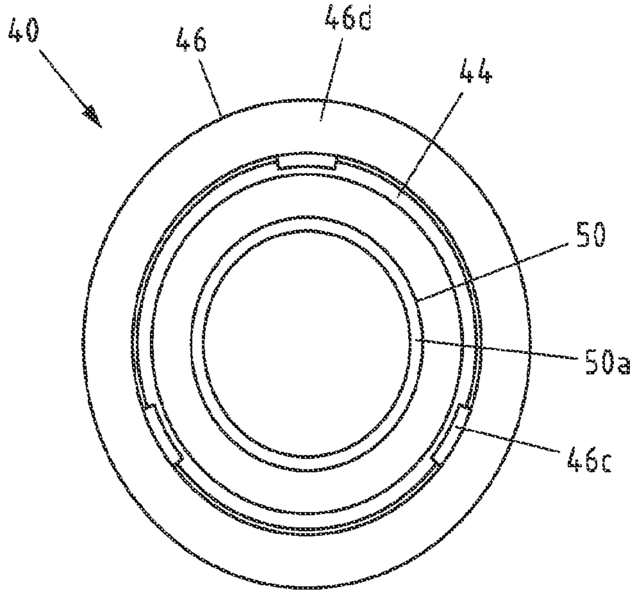
Figure 5D:
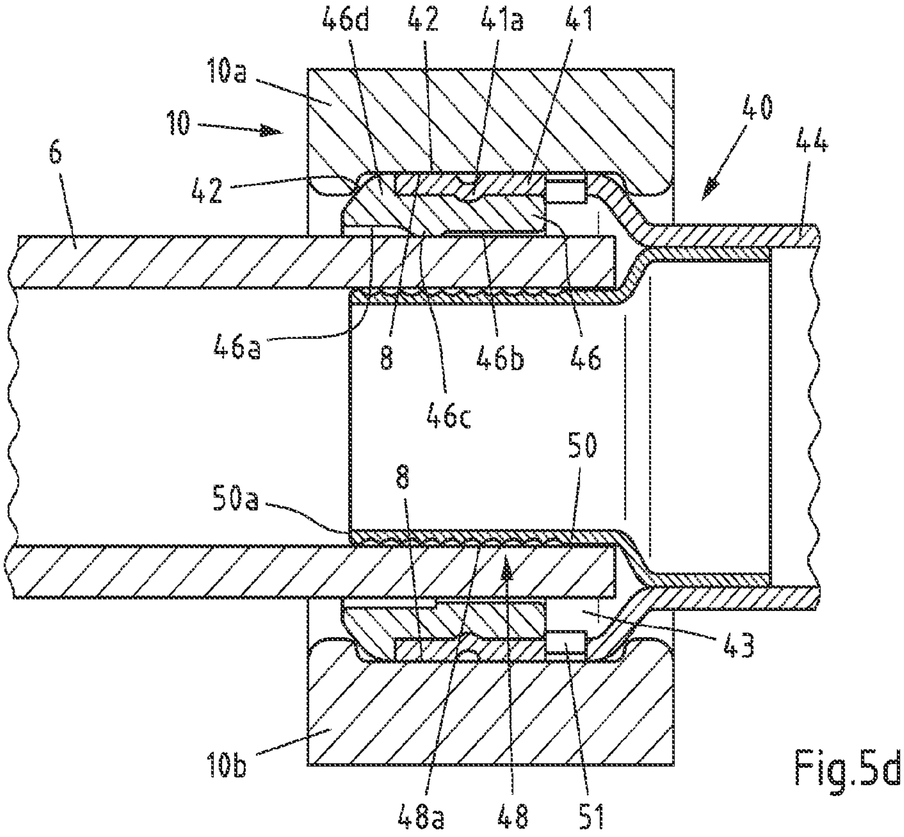

The press sleeve 41 and the support body 50 are arranged at a distance from each other and define a space for inserting and receiving the pipe 6, as can be seen in particular in FIG. 5*d*.

The press sleeve 41 and the support body 50 are joined to the base body 44 by welding. The support body 50 is required for sealing the flexible pipe 6, in particular a multi-layer composite pipe, against the fitting 40. The support body 50 is preferably made of metal and enables a significantly improved chemical resistance and robustness compared to support bodies made of a solid plastic.

Furthermore, the press sleeve 41 has depressions 41*a* in the wall in the form of punch marks for an internal locking of the force transmission ring 46 with the press sleeve 41. The force transmission ring 46 is thus positioned and fixed in the press sleeve 41.

The force transmission ring 46 has cylindrical sections 46*a* and 46*b* and an inwardly projecting rib 46*c* for engagement with the pipe 6 to be inserted.

The sealing of the fitting 40 against the pipe 6 is preferably ensured without an additional soft seal via the sealing contour 48 of the support body 50 and the force transmission by the force transmission ring 46.

Figure 5E:
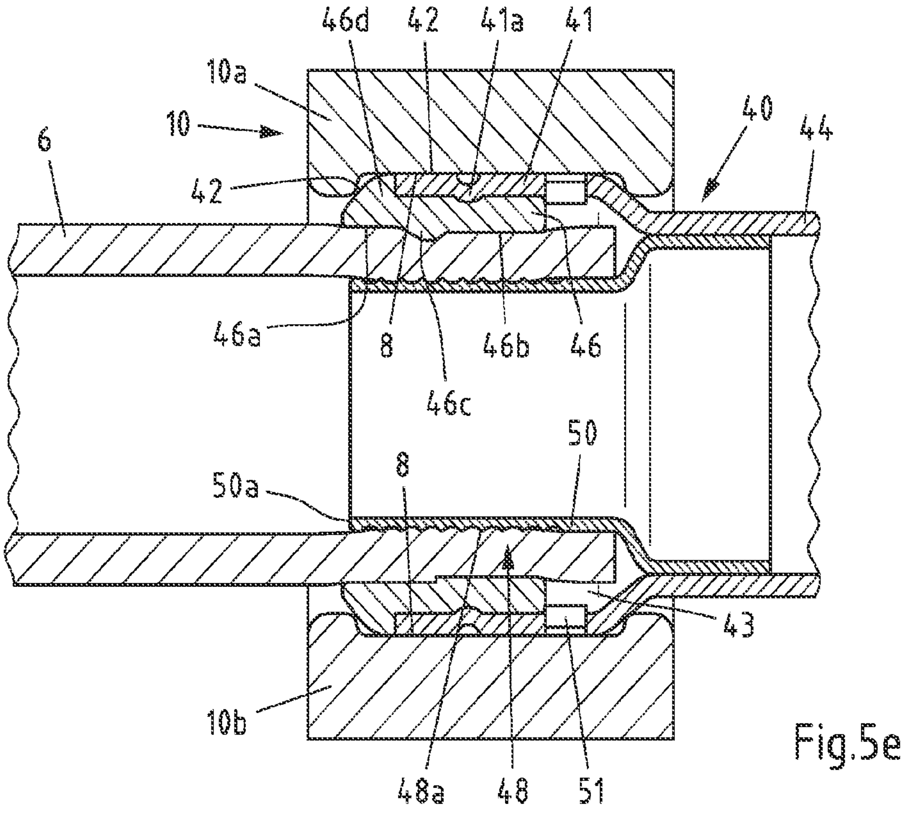

The pressing of the fitting 40 becomes clear by comparing FIGS. 5*d* and 5*e*. The two press jaw halves 10*a* and 10*b* are moved radially inwards and the press sleeve 41 is deformed radially inwards by the contact of the press contour 8 of the two press jaw halves 10*a* and 10*b*. On the one hand, this deforms the force transmission ring 46 so that the force is transmitted to the material of the pipe 6. The pipe 6 is thus deformed radially inwards and thereby pressed onto the sealing contour 48 of the support body 50 in a sealing manner. The sealing takes place at the outer end 50*a* of the support body 50 facing the pipe 6, so that no dead spaces are created in this area.

Securing against extraction of the pipe 6 is done, for example, via the retaining ribs 48*a* of the sealing contour 48.

Furthermore, FIGS. 5*a* to 5*e* show that a section 46*d* of the force transmission ring 46 projects axially from the press sleeve 41 and forms a section of the outer contour 42 to be pressed. This design achieves an external appearance that differs from that of the fitting 20 and facilitates differentiation between the fittings 20 and 40 of a system.

The press sleeve 41 also has a viewing window 51 so that it is possible to check the insertion of the pipe 6. If the pipe 6 has a special colour, this can be clearly visible as a signal colour through the viewing window 51 in the press sleeve 41.

Figure 6A:
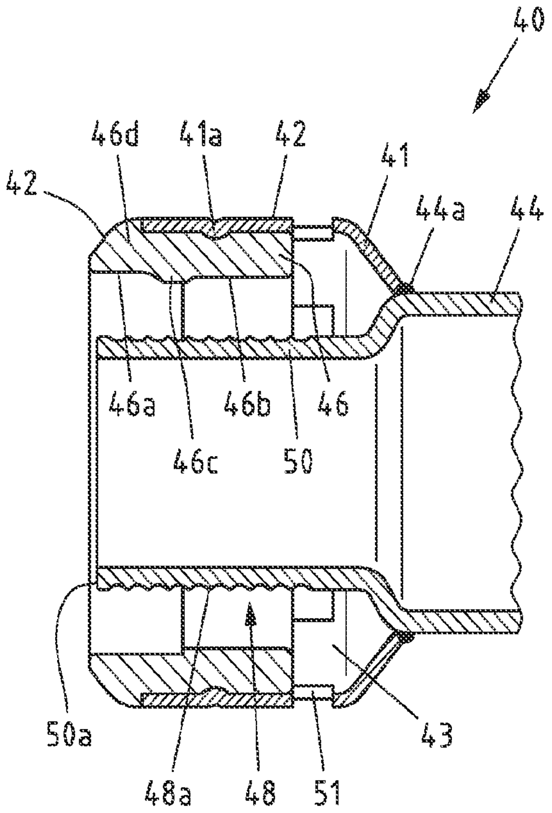

FIG. 6*a* shows a first alternative embodiment of the fitting 40, in which the press sleeve 41 is a separate part and is joined to the base body 44 by a weld 44*a*, while the support body 50 is integrally formed with the base body 44.

From the description of the fittings 20 and 40, the outer contours 22 and 42 of the press sleeves 21 and 41 are substantially the same, making the fittings 20 and 40 suitable for a system as shown in FIGS. 1*a* to 1*f*. Fittings 20 and 40 can be pressed by the same press jaw 10 without requiring a change of pressing tool when a user switches between press fittings 20 and press fittings 40.

Figure 6B:
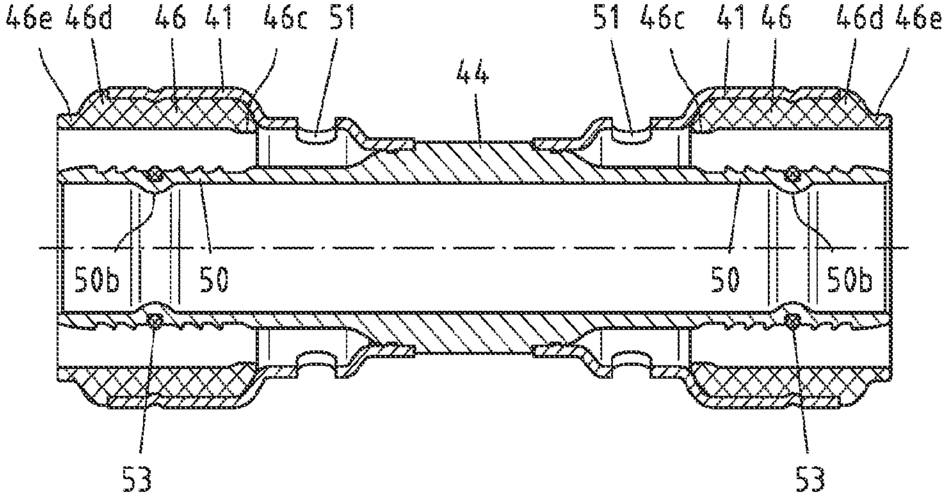

FIG. 6*b* shows another alternative embodiment of an unpressed fitting 40, where the same reference signs indicate the same or similar elements, each having the same functions.

In the embodiment according to FIG. 6*b*, an axial extension 46*e* of the section 46*d* of the force transmission ring 46 is provided, which facilitates and thus improves the application of a press tool. Furthermore, the rib 46*c* is designed to be axially inwardly offset, as a result of which, when a pipe is inserted, the friction to be overcome and the associated haptic signal when connecting occur at an axial position closer to the maximum insertion depth.

Furthermore, the fitting 40 according to FIG. 6*b* has a support body 50, on the outside of which a circumferential and radially inwardly extending depression in the form of a bead 50*b* is formed. A seal in the form of an O-ring 53 is arranged in the bead 50*b*, which rests against the inside of a pipe, when it is pushed on and creates an additional sealing effect during compression. This design is more favourable to flow than a continuous small inner diameter.

A further change of the fitting 40 compared to the design according to FIG. 6*a* is that the viewing window 51 is arranged axially offset in the direction of the base body 44 and is no longer arranged in the area of the press contour 8. An advantage of this design is that the viewing window can also be seen during the press process and is not covered by the press profile.

Figure 6C:
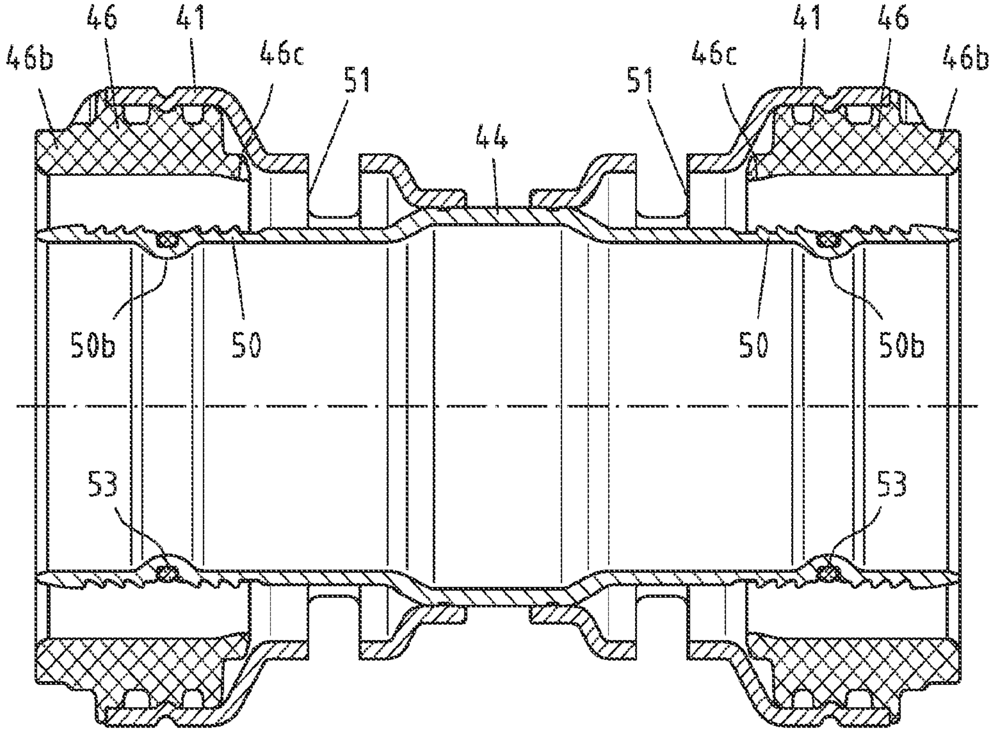

FIG. 6*c* shows a further embodiment which is essentially similar to the embodiment in FIG. 6*b*, wherein other dimensions have been chosen.

In contrast to FIGS. 6*a* and 6*c*, in FIG. 6*b* the base body 44 is designed as a solid turned part, whereas in FIGS. 6*a* and 6*c* the base body 46 is designed as a formed part.

FIGS. 7*a* to 7*d* show a fitting 120 for connection to a rigid pipe 4 for a system according to FIGS. 2*a* to 2*f*. The fitting 120 has a base body 124 and a press sleeve 121 connected thereto and forming an outer contour 122, the press sleeve 121 having a chamber 123 directed inwards towards the pipe 4 to be accommodated. At the distal end of the press sleeve 121, a sleeve section 121*a* is formed which extends beyond the chamber 123. The sleeve section 121*a* forms a section of the outer contour 122 to be formed. Furthermore, a sealing element 128 is arranged in the chamber 123.

The press sleeve 121 is positively moulded onto the base body 124 with a section 121*b*, resulting in a tapering of the diameter of the base body 124 in a section 124*a*. The press sleeve 121 is therefore firmly connected to the base body 124.

Furthermore, an inner section 124*b* of the base body 124 extends radially inside the chamber 123 in the direction of the pipe 4 to be inserted. A section 128*a* of the sealing element 128 is thereby arranged between the press sleeve 121 and the inner section 124*b* of the base body 124, and a further section 128*b* of the sealing element 128 is arranged between the press sleeve 121 and the pipe 4 to be inserted, as can be seen in particular from FIGS. 7*c* and 7*d*.

The sealing element 128 fills a substantial part of the chamber 123 and thus seals both on the side of the base body 124 and on the rigid pipe 4, which is pushed in at the end up to the base body 4. This enables separation into the area of the base body 124 that is in contact with the medium and the area of the press sleeve 121 that is not in contact with the medium. The long sealing element 128 also allows a high tolerance of the correct insertion depth of the pipe 4 and ensures an almost gap-free connection between the fitting 102 and the pipe 4.

Furthermore, the sleeve section 121*a* and the sealing element 128 have inwardly projecting cams 121*c* as well as cams 128*c* distributed over the circumference for guiding and holding the pipe 4. This achieves a retention of the pipe 4, a haptic feedback when overcoming the cams 121*c* as well as the cams 128*c* during the insertion of the pipe for checking the insertion depth and also a guidance of the pipe during insertion. In contrast, cams 128*d* of the sealing element 128, which are also arranged circumferentially, are already in contact with the outside of the inner section 124*b* in the unpressed state.

The factory-stamped cams 121*c* in the front section of the press sleeve 121 also serve a local deformation of the rigid pipe 4 during pressing. Therefore, no clamp ring with a holding function is necessary in this design. In addition, after pressing with the cams 121*c*, torsional strength is ensured.

Figure 7A:
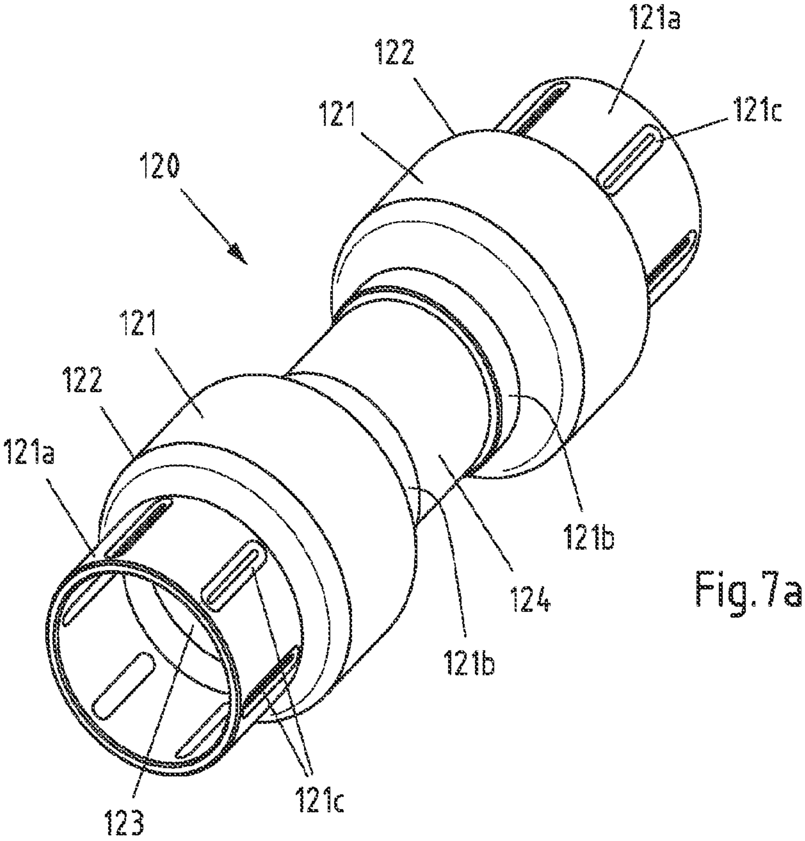
Figure 7B:
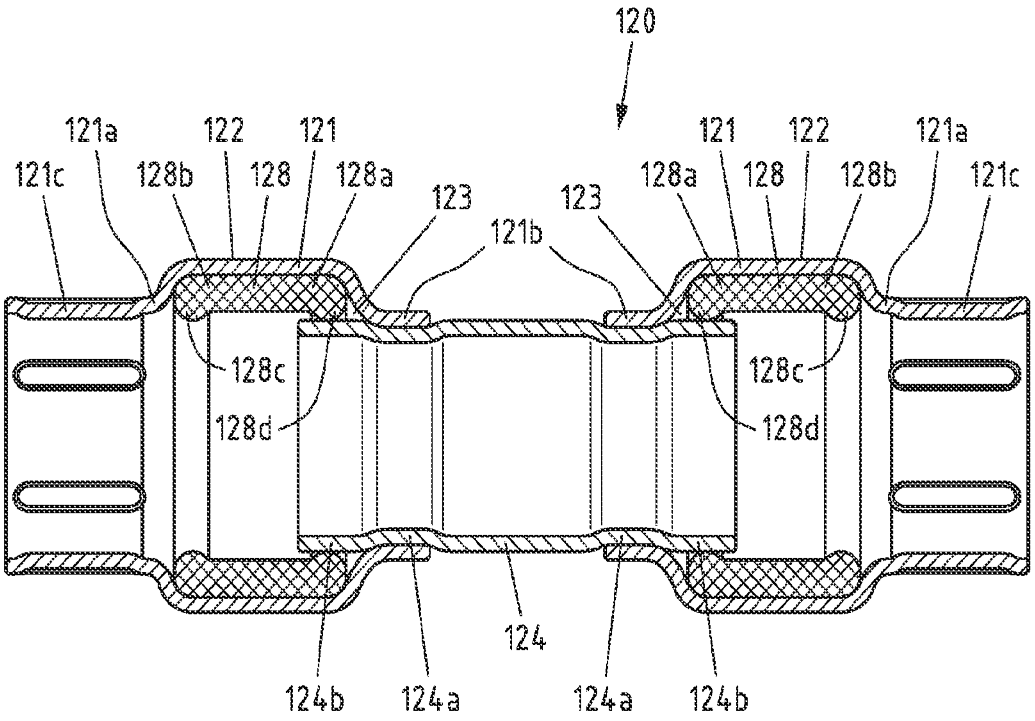
Figure 7C:
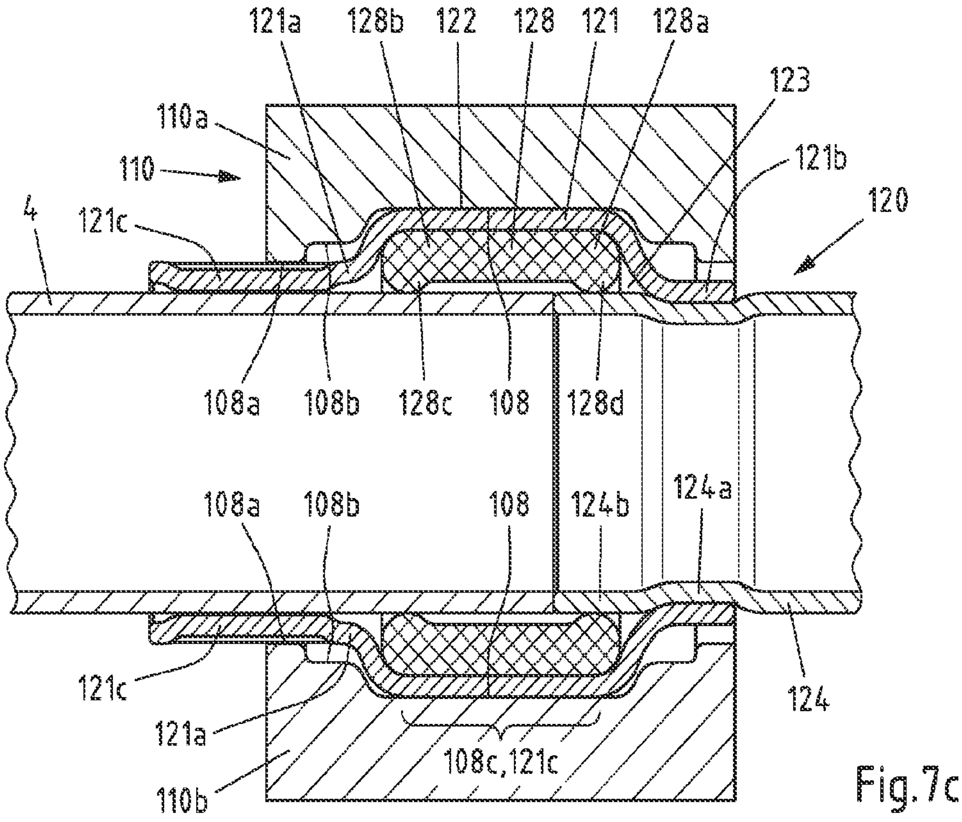
Figure 7D:
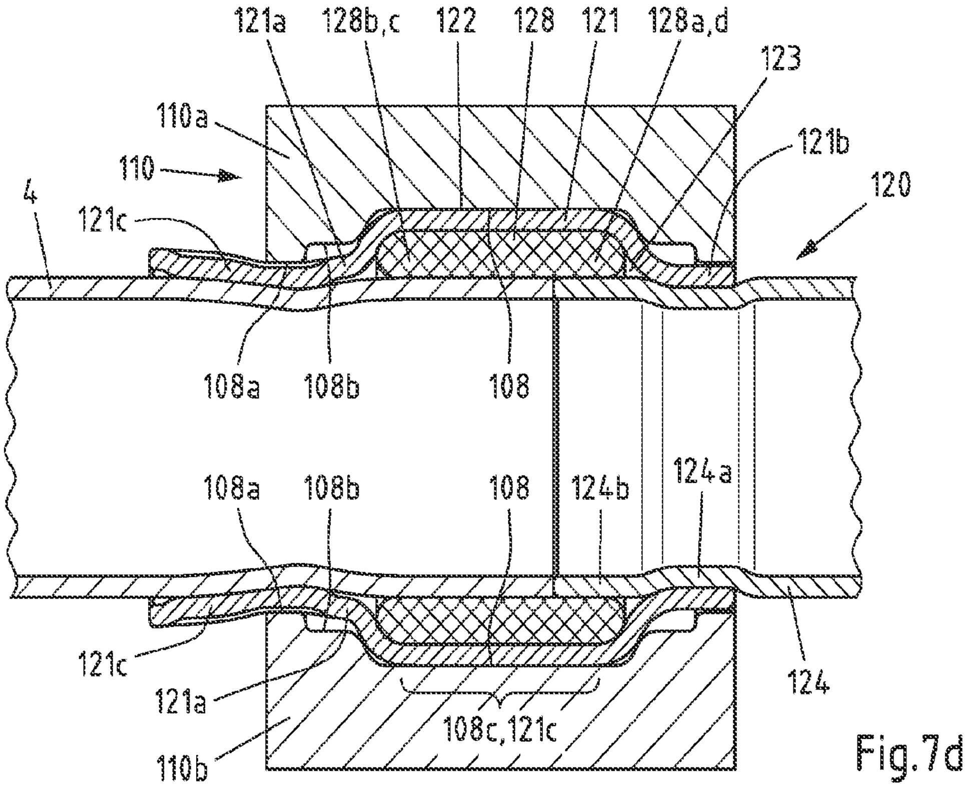

The press process is illustrated by a comparison between FIGS. 7*c* and 7*d*. The two press jaw halves 110*a* and 110*b* are moved radially inwards and the press sleeve 121 is deformed radially inwards by the contact of the press contour 108 of the two press jaw halves 110*a* and 110*b*. The sections 108*a* and 108*c* of the press contour 108 lie against the sections 121*a* and 121*c* of the press sleeve 121 and deform the press sleeve 121 radially inwards in these two sections. On the one hand, this deforms the section 121*a* onto the pipe 4, wherein the section 121*a* can be formed completely or only in sections on the circumference. On the other hand, the deformation of the section 121*c* leads to a deformation of the sealing element 128, so that the pipe 4 is sealed against the press sleeve 121. In this process, the section 128*a* and the cams 128*d*of the sealing element 128 are pressed against the outside of the inner section 124*a* of the base body 124. Similarly, the section 128*b* and the ring 128*c* are pressed against the outside of the pipe 4. In this way, both the base body 124 of the fitting 120 and the pipe 4 are sealed against the press sleeve 121 lying outside.

As can be further seen from FIGS. 7*c* and 7*d*, the inserted pipe 4 abuts the end face of the section 124*b* of the base body 124. This prevents a change in cross-section at the transition between the pipe 4 and the fitting 120.

Figure 7E:
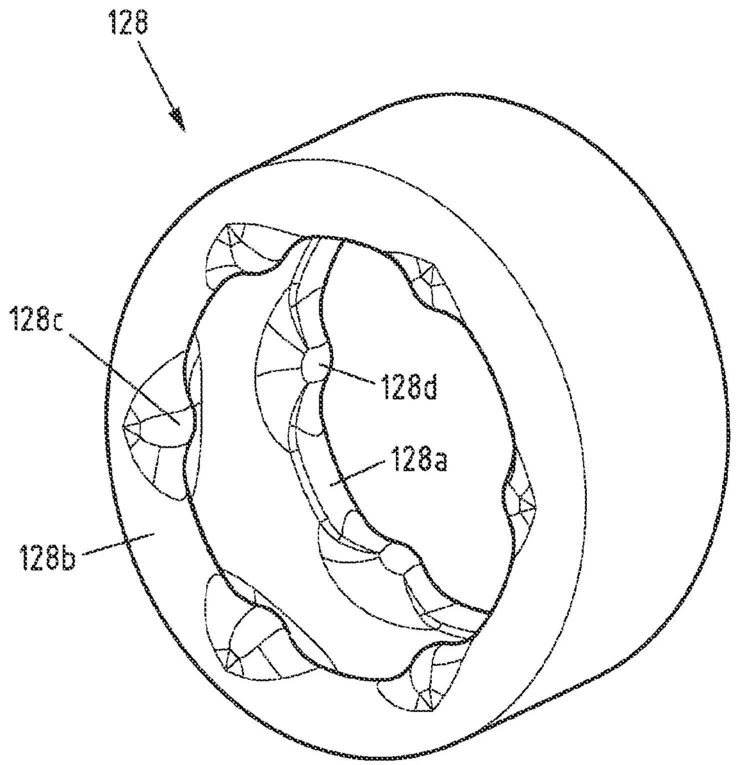
Figure 7F:
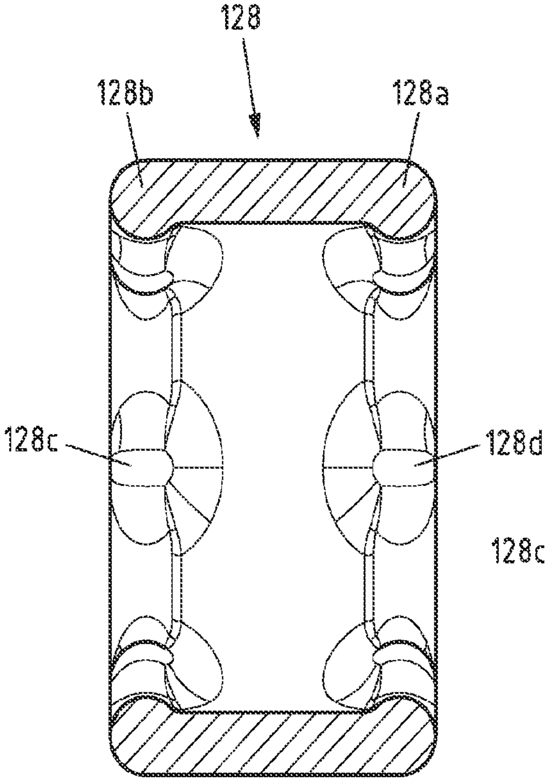
Figure 7G:
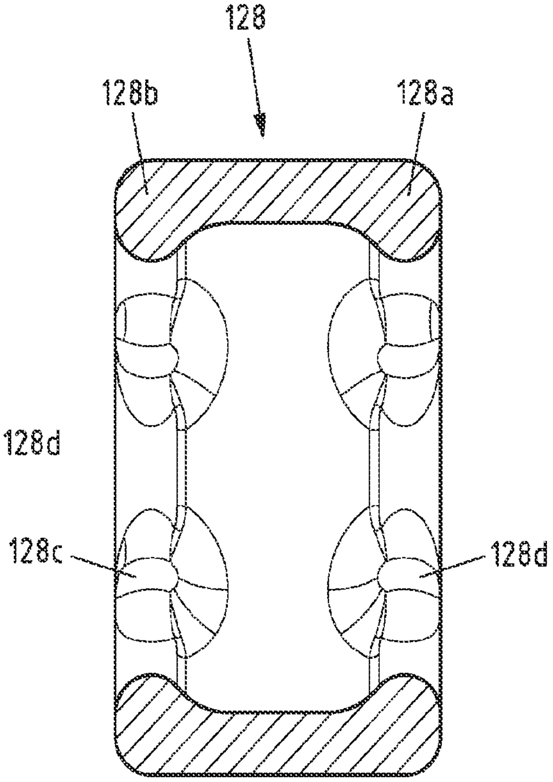

FIG. 7*e* shows the annular sealing element in a perspective view, while FIGS. 7*f* and 7*g* show the sealing element 128 in two views cut at different azimuth angles. The circumferential and inwardly directed bead-like sections

128*a* and 128*b* additionally have inwardly directed cams 128*c* and 128*d*, which have the functions described above.

FIGS. 8*a* to 8*d* show a fitting 140 for connection to a flexible pipe 6 for a system 102 according to FIGS. 2*a* to 2*f*. The fitting 140 has a base body 144, to which a press sleeve 141 forming an outer contour 142 is connected by material bonding. The press sleeve 141 further comprises a chamber 143 directed inwards towards the pipe 6 to be accommodated, in which a force transmission ring 146 is arranged. A support body 150 is also materially connected to the base body 144, which has a sealing contour 148 directed outwards towards the pipe 6 to be inserted. Alternatively, the support body 150 can also be formed integrally with the base body 144. The fitting 140 thus has, on each of the sides to be pressed, a three-part structure consisting of the base body 144 and the press sleeve 141 and support body 150 connected thereto.

The press sleeve 141 and the support body 150 are spaced apart and define an annular space for inserting and receiving the pipe 6.

The support body 150 is required to seal the flexible pipe 6, in particular a multilayer composite pipe, against the fitting 140. The support body 150 is preferably made of metal and enables a significantly improved chemical resistance and robustness compared to support bodies made of a solid plastic such as polyphenylene sulphone (PPSU).

The force transmission ring 146 has a toothed portion 146*a* for engagement with the pipe 6 to be inserted. This provides guidance and retention of the pipe 6 to enable a secured position of the pipe 4 relative to the fitting 140 prior to pressing. In the circumferential direction between the serrated portions 146*a*, recesses 146*c* are provided for improved flexibility of the force transmission ring 146. In addition, the force transmission ring 146 is formed as a C-ring to facilitate insertion into the press sleeve 141.

The sealing of the fitting 140 against the pipe 6 is ensured without an additional soft seal via the sealing contour 148 and the force transmission by the force transmission ring 146.

Due to the deformation of the press sleeve 141 during pressing, the flexible pipe 6 is pressed onto the sealing contour 148, wherein a sealing effect is achieved.

In the embodiment example shown, the sealing takes place at the outer end 150*a* of the support body 150 facing the pipe 6, so that no dead spaces are created here after pressing.

The pipe 6 is also secured against extraction by means of the retaining ribs 148*a* of the sealing contour 148.

Furthermore, the press sleeve 141 has a sleeve section 141*b* extending beyond the chamber 143, which forms a section of the outer contour 142 of the press sleeve 141 to be formed by a press jaw 110. For this purpose, the press jaw 110 has a corresponding section 108*b* of the press contour 108.

Figure 8A:
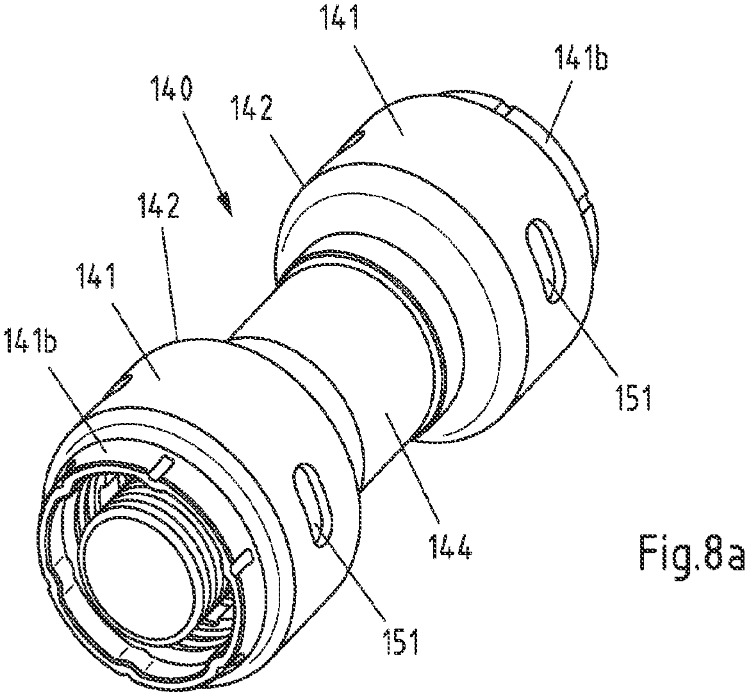
Figure 8B:
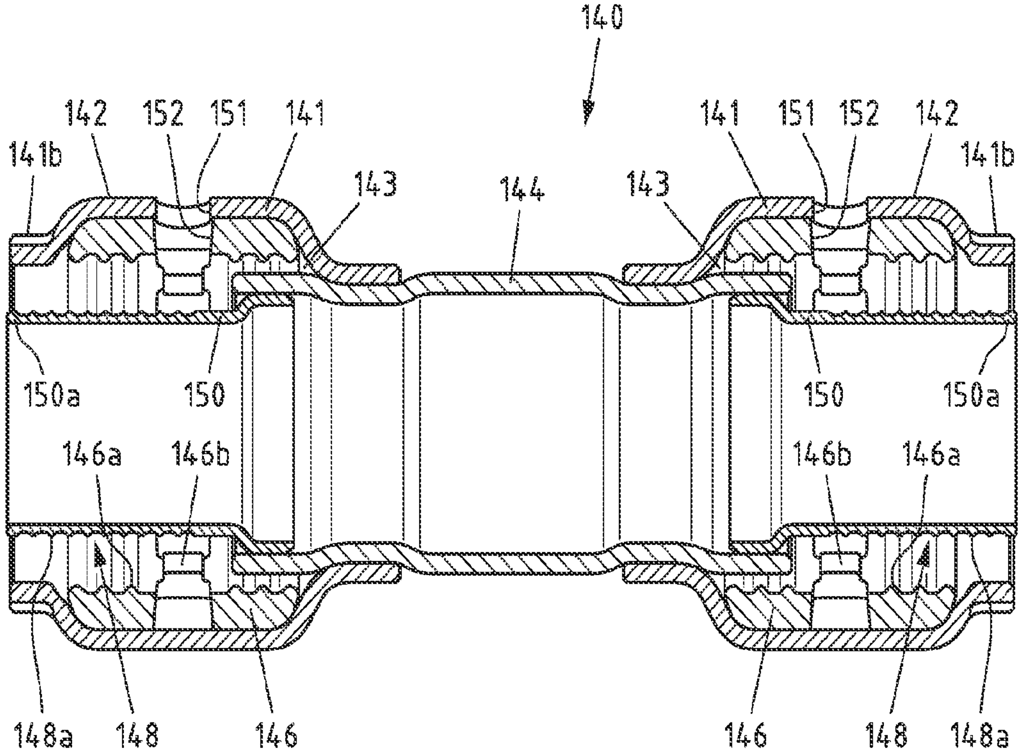
Figure 8C:
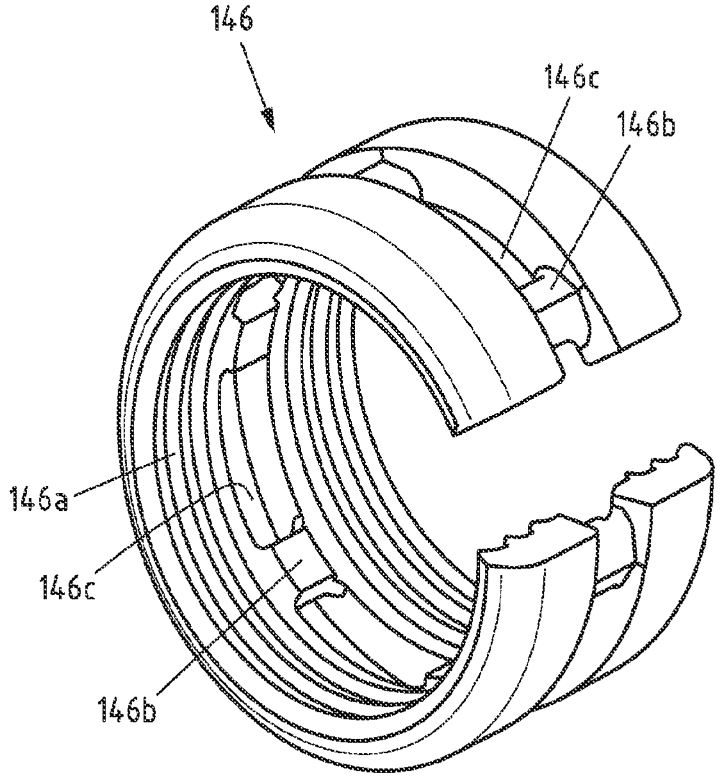
Figure 8D:
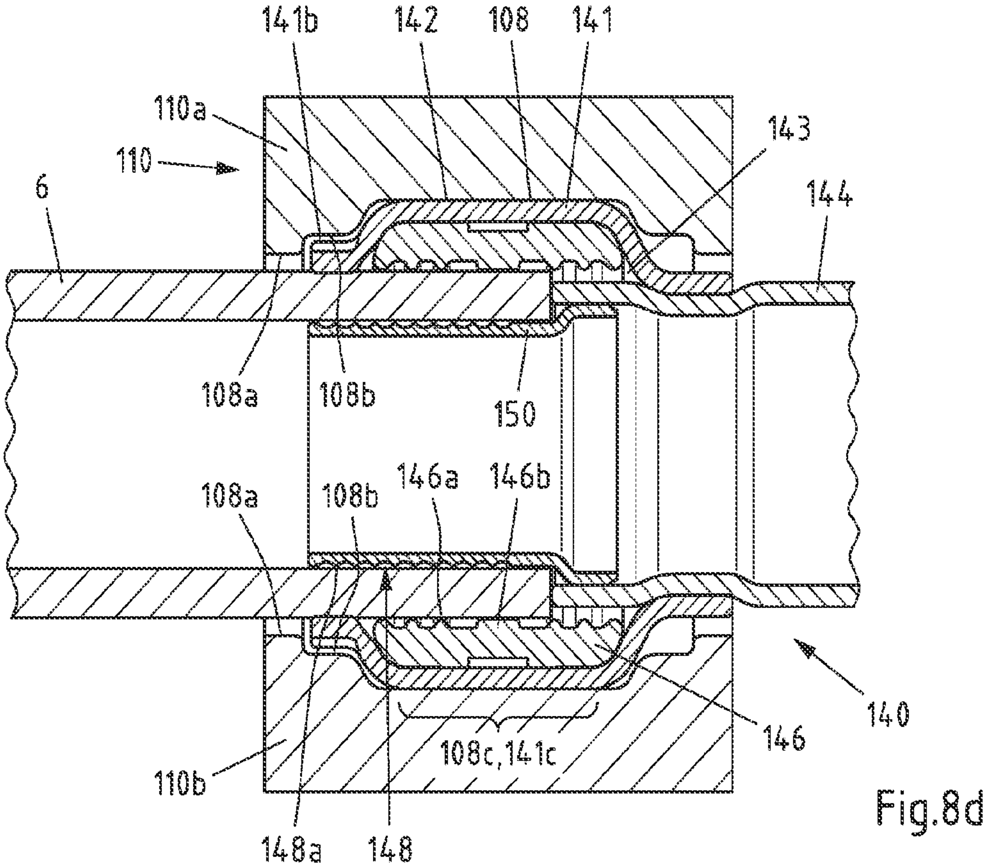
Figure 8E:
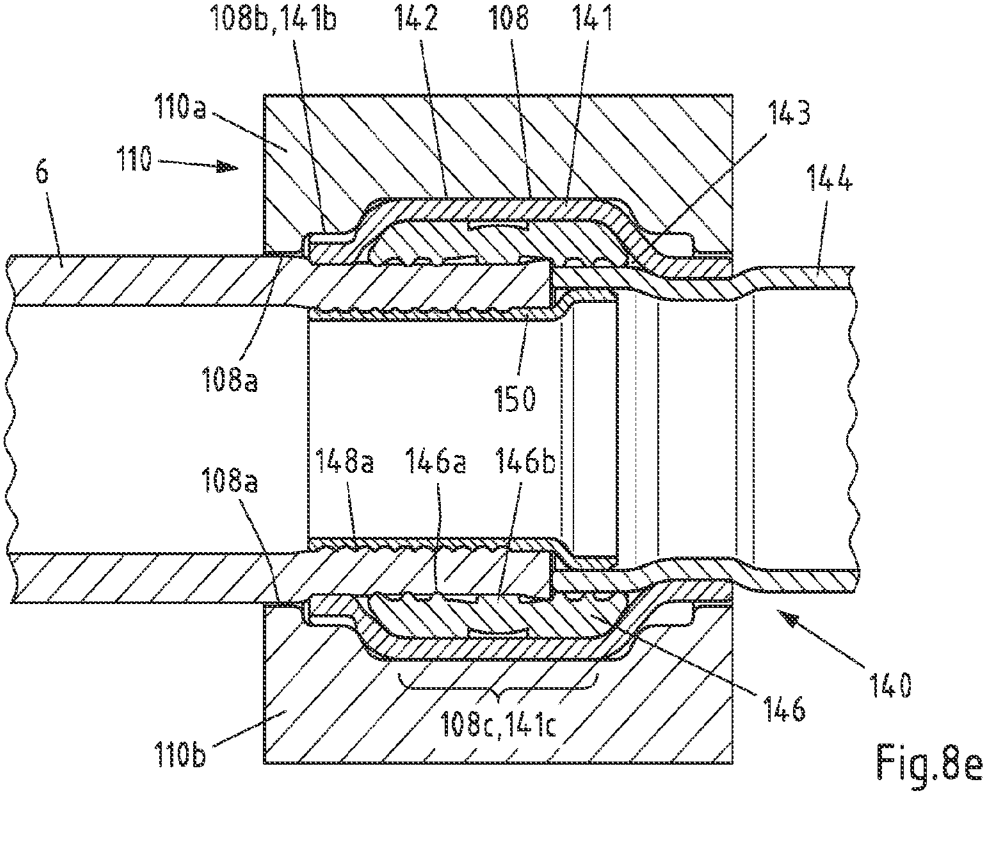

The press process results from a comparison of FIGS. 8*d* and 8*e*. The two press jaw halves 110*a* and 110*b* are moved radially inwards and the press sleeve 121 is deformed radially inwards by the contact of the press contour 108 of the two press jaw halves 110*a* and 110*b*. The sections 108*b* and 108*c* of the press contour 108 rest against the sections 141*b* and 141*c* of the press sleeve 141 and deform the press sleeve 141 radially inwards in these two sections. On the one hand, this causes the section 141*b* to be formed onto the pipe 4, wherein the section 141*b* can be formed completely or only in sections on the circumference. On the other hand, the deformation of the section 141*c* leads to the pipe 6 being formed onto the sealing contour 148 of the support body 150.

The force transmission ring 146 also has inwardly projecting webs 146*b* that define an inner cross-section that is equal to or slightly smaller than the outer diameter of the pipe 6. Thus, the circumferentially distributed webs 146*b* form a guide and support for the pipe 6.

Furthermore, the press sleeve 141 and the force transmission ring 146 have corresponding viewing windows 151 and 152. Thus, when installing the pipe 6 in the fitting 140, the insertion depth of the pipe 6 can be checked, as the sealing of the pipe 6 takes place on the inside via the support body 150.

The viewing windows 151 and 152 shown in FIG. 8*b* are not visible in FIGS. 8*d* and 8*e*, as a different section through the fitting has been chosen to show the webs 146*b* projecting inwards.

FIGS. 7*a* to 7*d* and 8*a* to 8*d* also show a system for connecting rigid pipes 4 and for connecting flexible pipes 6. On the one hand, the system has a plurality of fittings 120 for connecting to a rigid pipe 4 according to FIGS. 7*a* to 7*d* and, on the other hand, a plurality of fittings 140 for connecting to a flexible pipe 6 according to FIGS. 8*a* to 8*d*. The base body 124 of the fitting 120 and the base body 144 of the fitting 140 for connecting to a rigid pipe 6 are of the same design.

The press sleeve 121 or 141 is connected to each of the base bodies 124 or 144. For flexible pipes 6, the support body 150 is also used. The base body 124 or 144 also has only small forming straights and can therefore also be made of materials that are difficult to form, such as duplex steel or one of the ferritic steels mentioned above. The same basic body 124 or 144 can be used both in the fitting 120 for rigid pipes 4 and in the fitting 140 for flexible pipes 6, thus enabling a modular design of the fittings of the system described.

The system for joining rigid pipes 4 and for joining flexible pipes 6 according to FIGS. 7*a* to 7*d* and 8*a* to 8*d* is also suitable for a system 102 according to the invention according to FIGS. 2*a* to 2*f*.

However, the press sleeves 121 or 141 differ in the respective application for rigid pipes 4 and for flexible pipes 6 and are, for example, force-fitted to the base body 124 or 144 by factory pressing. A further advantage of the two-part construction consisting of a base body 124 or 144 and a press sleeve 121 or 141 is that the fitting 120 or 140 is divided into a base body 124 or 144 that is in contact with the medium and a press sleeve 121 or 141 that is not in contact with the medium. This makes it possible, for example, to manufacture the base body 124 or 144 and, if necessary, the support body 150 from a very high-quality, corrosion-resistant material, while using a low-cost material for the press sleeve 121 or 141. In principle, the material can be selected specifically with regard to the respective requirement, i.e. the medium to be conveyed with the rigid pipe 4 and/or the flexible pipe 6.

From the description of the fittings 120 and 140, the outer contours 122 and 142 of the press sleeves 121 and 141 are substantially the same, making the fittings 120 and 140 suitable for a system as shown in FIGS. 2*a* to 2*f*. Fittings 120 and 140 can be swaged by the same swaging jaw 110 without requiring a change in swaging tooling when a user switches between swaging fittings 120 and swaging fittings 140.

The invention claimed is:

1. A system for connecting rigid pipes and for connecting flexible pipes, wherein the pipes have corresponding outer diameters, the system comprising:

a press jaw having a press contour, at least one first fitting for press-fitting to a rigid pipe, wherein the at least one first fitting is formed as an externally sealing fitting and externally seals a rigid pipe to be connected, and wherein the at least one first fitting comprises a first press sleeve having a first outer contour, at least one second fitting for press-fitting to a flexible pipe, wherein the at least one second fitting is formed as an internally sealing fitting and seals a flexible pipe to be connected from an inside, and wherein the at least one second fitting comprises a second press sleeve having a second outer contour, wherein the first outer contour of the first press sleeve and the second outer contour of the second press sleeve are each adapted at least in sections to the press contour of the press jaw and can be pressed by the press jaw.

2. The system according to claim 1, wherein, the first outer contours of the first press sleeve and of the second outer contout of the second press sleeve match at least in sections.

3. The system according to claim 1, wherein, the first and second press sleeves each form a chamber directed inwards towards the pipe to be received, and at least one clamp element, sealing element and/or force transmission element is accommodated in the chamber.

4. The system according to claim 3, wherein the chamber of the first press sleeve and the chamber of the second press sleeve accommodate different clamp elements, sealing elements and/or force transmission elements.

5. The system according to claim 3, wherein, a ratio of a volume V (starr) of the chamber of the press sleeve of the first fitting to a volume V (flex) of the chamber of the press sleeve of the second fitting is given by $$\delta = \frac{V(starr)}{V(\text{flex})},$$

the volume V (starr) is given by $$V(starr) = \frac{\pi \cdot LK(starr)}{4} \cdot \left(DK(starr)^2 - DR(starr)^2\right),$$

with LK (starr) a length of the chamber, with DK (starr) an inner diameter of the chamber and with DR (starr) an outer diameter of the rigid pipe to be accommodated, the volume V (flex) is given by $$V(\text{flex}) = \frac{p \cdot LK(\text{flex})}{4} \cdot \left(DK(\text{flex})^2 - DR(\text{flex})^2\right),$$

with LK (flex) a length of the chamber, with DK (flex) an inner diameter of the chamber and with DR (flex) a diameter of the flexible pipe to be accommodated, a ratio is given by $$\delta = \frac{V(starr)}{V(\text{flex})} = \frac{LK(starr)}{LK(\text{flex})} \cdot \frac{\left(DK(starr)^2 - DR(starr)^2\right)}{\left(DK(\text{flex})^2 - DR(\text{flex})^2\right)},$$

and in that δ assumes values from a value range [0.50; 3.00].

6. The system according to claim 3, wherein, a ratio of the difference between an inside diameter DK (starr) of the chamber of the press sleeve of the first fitting and an outside diameter DR (starr) of the rigid pipe to be accommodated to twice a length LK (starr) of the chamber is given by $$\varepsilon(starr) = \frac{DK(starr) - DR(starr)}{2 \cdot LK(starr)}$$

and

ε(starr) assumes values from a range of values [0.10; 0.50].

7. The system according to claim 3, wherein, a ratio of the difference between the inner diameter DK(flex) of the chamber of the press sleeve of the second fitting and the external diameter DR(flex) of the flexible pipe to be accommodated to twice the length LK(flex) of the chamber is given by $$\varepsilon(\text{flex}) = \frac{DK(\text{flex}) - DR(\text{flex})}{2 \cdot LK(\text{flex})}$$

and

ε(starr) assumes values from a range of values [0.10; 0.70], in particular [0.10; 0.50].

8. The system according to claim 3, wherein,

ε(starr) is given by $$\varepsilon(starr) = \frac{DK(starr) - DR(starr)}{2 \cdot LK(starr)},$$

with an inner diameter DK(starr) of the chamber of the press sleeve of the first fitting and with an outer diameter DR(starr) of the rigid pipe to be accommodated and with a length LK(starr) of the chamber, ε(flex) is given by $$\varepsilon(flex) = \frac{DK(flex) - DR(flex)}{2 \cdot LK(flex)},$$

with an inner diameter DK(flex) of the chamber of the press sleeve of the second fitting and with an outer diameter DR(flex) of the flexible pipe to be accommodated and with a length LK(flex) of the chamber, a ratio $\alpha$ is given by $$\alpha = \frac{\varepsilon(starr)}{\varepsilon(\text{flex})} = \frac{LK(\text{flex})}{LK(starr)} \cdot \frac{(DK(starr) - DR(starr))}{(DK(\text{flex}) - DR(\text{flex}))}$$

and that $\alpha$ assumes values from a value range [0.50; 3.00].

9. The system according to claim 3, wherein, a degree of compression $\beta$(starr) when the first fitting is press-fitted to a rigid pipe is given by $$\beta(starr) = \frac{DK(starr) + 2s(starr) - DPK(starr)}{DR(starr)},$$

with an inner diameter DK(starr) of the chamber of the press sleeve of the first fitting before pressing, with a wall thickness s(starr) of the press sleeve in the area of the first fitting to be pressed before pressing, with an outer diameter DR(starr) of the rigid pipe to be accommodated before pressing and with an inner diameter DPK(starr) of the press contour of the press jaw in the region of the first fitting to be pressed after pressing, and $\beta$(starr) assumes values with $\beta$(starr)<0.15.

10. The system according to claim 3, wherein, a degree of compression $\beta$(flex) when the second fitting is press-fitted to a flexible pipe given by $$\beta(\text{flex}) = \frac{DK(\text{flex}) + 2s(\text{flex}) - DPK(\text{flex})}{DR(\text{flex})},$$

with an inner diameter DK(flex) of the chamber of the press sleeve of the second fitting before pressing, with a wall thickness s(flex) of the press sleeve in the area of the second fitting to be pressed before pressing, with an outer diameter DR(flex) of the flexible pipe to be accommodated before pressing and with an inner diameter DPK(flex) of the press contour of the press jaw in the region of the second fitting to be pressed after pressing, and $\beta$(flex) assumes values with $\beta$(flex)<0.15.

11. The system, according to claim 3, wherein, a degree of compression $\beta$(starr) when the first fitting is press-fitted to a rigid pipe is given by $$\beta(starr) = \frac{DK(starr) + 2s(starr) - DPK(starr)}{DR(starr)},$$

with an inner diameter DK(starr) of the chamber of the press sleeve of the first fitting before pressing, with a wall thickness s(starr) of the press sleeve in the area of the first fitting to be pressed before pressing, with an outer diameter DR(starr) of the rigid pipe to be accommodated before pressing and with an inner diameter DKP(starr) of the press jaw in the region of the first fitting to be pressed after pressing, a degree of compression $\beta$(flex) when the second fitting is press-fitted to a flexible pipe is given by $$\beta(\text{flex}) = \frac{DK(\text{flex}) + 2s(\text{flex}) - DPK(\text{flex})}{DR(\text{flex})},$$

with an inner diameter DK(flex) of the chamber of the press sleeve of the second fitting before pressing, with a wall thickness s(flex) of the press sleeve in the area of the second fitting to be pressed before pressing, with an outer diameter DR(flex) of the flexible pipe to be accommodated before pressing and with an inner diameter DPK(flex) of the press contour of the press jaw in the region of the second fitting to be pressed after pressing, a ratio $\tau$ is given by $$\tau = \frac{\beta(starr)}{\beta(\text{flex})} = \frac{DK(starr) + 2s(starr) - DPK(starr)}{DK(\text{flex}) + 2s(\text{flex}) - DPK(\text{flex})} \frac{DR(\text{flex})}{DR(starr)},$$

and $\tau$ assumes values from a value range [0.50; 1.50].

12. The system according to claim 1, wherein, the first press sleeve has a first additional press section, the second press sleeve has a second additional press section, wherein the first additional press section and the second additional press section have outer contours differing from each other and can each be formed in sections by the press jaw.

13. A fitting for connection to a flexible pipe for a system according to claim 1, the fitting comprising:

a base body, a press sleeve connected to the base body and forming an outer contour, the press sleeve having a chamber directed inwards towards the pipe to be accommodated, a force transmission ring arranged in the chamber and a support body connected to the base body and provided with a sealing contour directed outwards towards the pipe to be inserted, wherein the force transmission ring is assembled in the press sleeve, wherein the press sleeve including the force transmission ring and the support body are arranged at a distance from each other and define an annular space for inserting and receiving the flexible pipe, wherein a portion of the force transmission ring protrudes axially from the press sleeve and forms a portion of the outer contour to be pressed, wherein the press sleeve together with the force transmission ring and the support body seal the flexible pipe to be connected from the inside.

14. A fitting for connection to a rigid pipe for a system according to claim 1, the fitting comprising:

a base body, a press sleeve connected to the base body and forming an outer contour, the press sleeve having a chamber directed inwards towards the pipe to be accommodated, a sleeve section formed at the distal end of the press sleeve and extending beyond the chamber, the sleeve section forming a portion of the outer contour to be formed, and a sealing element arranged in the chamber, wherein an inner portion of the base body extends radially inside the chamber in the direction of the pipe to be inserted, wherein a section of the sealing member is disposed between the press sleeve and the inner portion of the base body, wherein a portion of the sealing element is arranged between the press sleeve and the pipe to be inserted, wherein the press sleeve together with the sealing element seals the rigid pipe to be connected from the outside.

15. The fitting according to claim 14, wherein at least one of the sleeve section or the sealing element has inwardly projecting cams for guiding and holding the pipe.

16. A fitting for connection to a flexible pipe for a system according to claim 1, the fitting comprising:

a base body, a press sleeve connected to the base body and forming an outer contour, the press sleeve having a chamber directed inwards towards the pipe to be accommodated, a force transmission ring arranged in the chamber, and a support body connected to the base body and provided with a sealing contour directed outwards towards the pipe to be inserted, wherein the press sleeve and the support body are connected to the base body as separate elements, and wherein the press sleeve and the force transmission ring have corresponding viewing windows, wherein the press sleeve together with the force transmission ring and the support body seal the flexible pipe to be connected from the inside.

17. The fitting according to claim 16, wherein the press sleeve has a sleeve section extending beyond the chamber, the sleeve section forming a portion of the outer contour to be formed by a press jaw.

18. A fitting for connection to a rigid pipe for a system according to claim 1, the fitting comprising:

a base body, a stop element formed circumferentially in the base body and projecting inwards, a press sleeve connected to the base body and forming an outer contour, the press sleeve having a chamber directed inwards towards the pipe to be accommodated, a clamp ring arranged in the chamber, wherein the clamp ring consists of a plastic material and has a plurality of clamp elements aligned against the pull-out direction of the pipe to be inserted, and wherein the clamp elements are arranged in the distal area of the chamber opposite the stop element and are bearing against the wall in a distal outer corner area of the press sleeve, and a sealing element arranged in the chamber adjacent to the stop element, wherein the press sleeve together with the clamp ring, the clamp elements and the sealing element seal the rigid pipe to be connected from the outside.

19. The fitting according to claim 18, wherein the clamp ring has inwardly directed webs spaced apart from the clamp elements, the webs defining an internal cross-section which is equal to or slightly smaller than an external diameter of the pipe.

20. The fitting according to claim 18, wherein the stop element consists of at least two inwardly directed recesses, for example punch marks.

21. The fitting according to any claim 18, wherein the seal is designed at least in sections as a lip seal and, after pressing, seals the gap between the pipe and the press sleeve up to an end of the inserted pipe.

22. A system for joining rigid pipes and for joining flexible pipes, the system comprising:

a plurality of first fittings for connection to a rigid pipe, the first fittings being formed as externally sealing fittings and sealing from the outside rigid pipes to be connected, and a plurality of second fittings for connecting to a flexible pipe, wherein the second fittings are formed as internally sealing fittings and seal the flexible pipe to be connected from the inside, wherein the first fittings for connecting to a rigid pipe comprise:

a base body and a press sleeve connected to the base body, wherein the second fittings for connection to a flexible pipe comprise:

a base body, a press sleeve connected to the base body and a support body connected to the base body, wherein the base body of the first fitting for connection to a rigid pipe and the base body of the second fitting for connection to a flexible pipe have the same structure.

23. The system according to claim 22, wherein, the first fittings are adapted to be connected to a rigid pipe, and the second fittings are adapted to be connected to a flexible pipe.

* * * * *